US012616639B2

(12) United States Patent
Schwartz et al.

(10) Patent No.: US 12,616,639 B2
(45) Date of Patent: May 5, 2026

(54) AUTOMATED CPR CHEST COMPRESSION DEVICE

(71) Applicants: Efraim Schwartz, Paramus, NJ (US); Ariel Fabian, Paramus, NJ (US)

(72) Inventors: Efraim Schwartz, Paramus, NJ (US); Ariel Fabian, Paramus, NJ (US)

(*) Notice: Subject to any disclaimer, the term of this patent is extended or adjusted under 35 U.S.C. 154(b) by 0 days.

(21) Appl. No.: 18/420,378

(22) Filed: Jan. 23, 2024

(65) Prior Publication Data

US 2025/0235379 A1 Jul. 24, 2025

(51) Int. Cl.
*A61H 31/00* (2006.01)

(52) U.S. Cl.
CPC ..... *A61H 31/006* (2013.01); *A61H 2201/123* (2013.01); *A61H 2201/1418* (2013.01); *A61H 2201/1619* (2013.01)

(58) Field of Classification Search
CPC .... A61H 31/00; A61H 31/006; A61H 31/007; A61H 2201/123; A61H 2201/1418; A61H 2201/1619
See application file for complete search history.

(56) References Cited

U.S. PATENT DOCUMENTS 3,489,140 A 1/1970 Mullikin
9,149,412 B2 10/2015 Faller et al.
2013/0338550 A1* 12/2013 Faller .................. A61H 31/007 601/41
2014/0221882 A1* 8/2014 Jeppsson .............. A61H 31/006 601/41
2015/0328083 A1 11/2015 Delisle et al.
2016/0128899 A1* 5/2016 Lurie ................. A61G 13/1215 601/41
2017/0209336 A1 7/2017 Rubin
2019/0117502 A1* 4/2019 Arbuck ................ A61H 31/005

FOREIGN PATENT DOCUMENTS

CN 113599223 A * 11/2021 ........... A61H 31/008
CN 115501103 A * 12/2022 ........... A61H 31/006
DE 2156965 A1 11/1972

OTHER PUBLICATIONS

Search Report for International Patent Application No. PCT/US2025/012658, dated Mar. 4, 2025.

* cited by examiner

*Primary Examiner* — Justine R Yu
*Assistant Examiner* — Matthew R Moon
(74) *Attorney, Agent, or Firm* — PEARL COHEN ZEDEK LATZER BARATZ LLP

(57) ABSTRACT

An automated chest compression device has a shaped actuator rotatably mounted about a shaft and a chest compression plate configured to move linearly based on the shape of the actuator, wherein engagement of the actuator with the chest compression plate converts rotary motion of the actuator into linear motion of the chest compression plate, and whereby, when the device is positioned against the chest of a patient in need of CPR, rotation of the actuator causes the chest compression plate to move linearly in a direction towards and away from the patient's chest and to thereby induce compression and to allow decompression, respectively, of the patient's chest.

18 Claims, 17 Drawing Sheets

30
C
B
A
D
220
30
220
7A
7B
7C

AUTOMATED CPR CHEST COMPRESSION DEVICE

FIELD OF THE INVENTION

The invention is related to the Cardiopulmonary Resuscitation (CPR) field and, more particularly, to a device for the automated delivery of chest compression via a non-invasive CPR positioning apparatus.

BACKGROUND OF THE INVENTION

The term cardiac arrest refers to a set of conditions that deny the brain from getting enough oxygenated blood (hypoxia) due to inefficiency of the heart (known as fibrillation) or heart stoppage (known as a heart attack). As stated in the AHA Journal article "Optimizing Outcomes After Out-of-Hospital Cardiac Arrest With Innovative Approaches to Public-Access Defibrillation: A Scientific Statement From the International Liaison Committee on Resuscitation", published Feb. 15, 2022, more than seven people experience an out-of-hospital cardiac arrest every minute globally. This is about 3.8 million people annually, of whom only 8% to 12% survive to hospital discharge. Out-of-hospital cardiac arrest (OHCA) is a time-sensitive, life-threatening emergency that occurs millions of times annually. The probability of survival after OHCA can be markedly increased if immediate cardiopulmonary resuscitation (CPR) is provided and an automated external defibrillator (AED) is used.

According to this article, six minutes is the global median response time for professional EMS responders to arrive after the call for help, while even in developed urban settings with optimized EMS, it takes more than six minutes from the time of cardiac arrest until professional assistance arrives. This delay is critical because, according to the AHA, the neurological damage from brain hypoxia starts after four minutes. Only blood circulation will maintain a survivable level of oxygenated blood in the brain and avoid neurological damage or death. Without a natural heartbeat, the only way to achieve that is through CPR.

According to the AHA, when cardiac arrest occurs, the first and immediate aid to the patient is CPR. According to the AHA, even bad CPR is better than no CPR.

The basic position to administer CPR is by leaning above the patient's chest, putting both palms (one on top of the other) on the patient's sternum, and compressing the patient's chest approximately 2.5 inches in depth and at a pace of 100 to 120 compressions per minute. In order to achieve that efficiency, the opposite side of the compression (mostly the patient's back) must be supported by a firm base opposed to the compression side.

The National Institute of Health (NIH) recommends that EMS personnel and physicians perform active CPR for 20 minutes before calling the time of death.

Disruptions of efficient human CPR for those who try to administer CPR are the physical inability of sustaining a consistent rate of depth and frequency of chest compression, difficult surrounding conditions, concomitant risks to the CPR operator, a simultaneous need to help others, difficulty communicating with professional help, and more.

Another hurdle for a bystander is the commitment to continue with CPR until professional help arrives, which may take some time. Inconsistency in application or stoppage of the CPR may result in hypoxia that will lead to neurological damage (beginning four minutes after the cardiac arrest) and ultimately the patient's death. For most cases in which (especially untrained) bystanders are not able or willing to try CPR on a patient (for any reason), the existence of a CPR device may be the sole factor that will promote the chance that a bystander will take action and help the cardiac arrest patient.

An automated CPR apparatus allows even an untrained bystander to perform CPR simply by arranging the apparatus around a patient and starting the device. An automated CPR apparatus includes two elements: an automated chest compression unit that compresses the chest of the patient, and a positioning structure to position the compression device above the patient's Sternum. See, for example, the automated CPR apparatuses disclosed in U.S. Pat. Nos. 8,690,804, 9,320,678, 10,022,295, 10,406,068 and 10,849,820, and in US Patent Application Publications Nos. 2004/0162510, 2009/0187123 and 2010/0063425A1. The automated chest compression unit delivers the compression pressure and relief in an automated fashion without further action by the operator. The positioning structure, otherwise described herein as a CPR positioning frame, for example, as shown in U.S. Pat. No. 11,744,772 by the inventors hereof, is erected against or around the patient and allows the automated chest compression unit to be positioned in the appropriate location to deliver automated CPR.

The automated chest compression device is a mechanical CPR apparatus that mimics manual CPR activity while correcting the potential deficiencies of human-performed CPR, mainly sustaining the depth and rate of chest compression over time. Once positioned against the patient's chest, generally via a frame to which the automated chest compression device is attached, the electromechanically operated and non-invasive automated chest compression device provides CPR chest compressions to the patient using a plate that transmits alternatingly chest compression pressure at the AHA recommended speed and depth, delivering the push and release of the power/pressure.

Most automated chest compression devices use a sort of plunger that delivers the power from the power-unit to the chest, compressing the chest and retracting the compression after reaching maximum depth, and replacing the body weight and muscles of a human with a power source for automatic CPR devices that comes from an electrical motor or another power delivery, such as a hydraulic or pneumatic mechanism. Continuing with performing the compression/retraction with the frequency required for CPR is a necessary element for mimicking manual CPR.

A manual CPR cycle includes two major actions: 1) exerting pressure on the sternum in order to compress the patient's ribcage, and 2) releasing the exerted pressure and allowing the ribcage to decompress naturally; an automated chest compression device mimics this cycle exactly. The automated chest compression device can be mounted on any structure that positions the apparatus above the center of the patient's chest and provides counter-rigidity to the compression force.

The term power unit can refer to the motor itself or to a combination of a motion unit (rotation or otherwise) and a gearbox, where the source of power can be electrical, pneumatic, or other. The gearbox, otherwise known as a gear reducer or speed reducer, or perhaps more accurately as a speed regulator. It is a set of gears that can be added to a motor to decrease speed and/or increase torque drastically. Some gear reducers include planetary, parallel shaft, right angle worm, and right angle planetary (bevel). For example, a DC-gear motor is an all-in-one combination of a motor and gearbox. Adding a gearhead to a motor reduces the speed while increasing the torque output. The importance of a gearbox to the apparatus is the ability to maintain a predefined active RPM regardless of the speed of the motor.

There are several types of apparatuses that provide automatic mechanical (not AED) CPR. One such apparatus uses a touch-point that is placed against the patient's chest and is pushed by a piston/plunger and powered by various options, including electrical and pneumatic motors. Some such apparatuses use their motor to retreat the piston/plunger to its initial position, whereas others release the pressure on the piston/plunger. Either way, when the pressure on the piston/plunger returns, it is not necessarily a graduated pressure but often rather a sudden force delivered from sometimes a short distance away from the chest. The result is a sudden force, like a "punch", to the chest, even before the beginning of the compression, that can cause major complications, such as ribs/sternum fracture, pneumothorax, hemothorax, lung parenchymal damage, and major bleeding. Sec, Safwat Saleem et al., "Traumatic Injuries Following Mechanical versus Manual Chest Compression", Open Access Emergency Medicine, Vol. 14, pp. 557-562, Oct. 4, 2022.

Other such automated chest compression devices are "band" based, which replaces the piston with a band that contracts around the patient's chest, and the result is the pressure on the area inside the band, i.e., the chest.

SUMMARY OF THE INVENTION

In general, the objective of this invention is to provide an automated chest compression device that provides automated CPR compression of a human chest in frequency and depth according to the guidelines of the AHA. The execution of such compression performs effective, steady CPR that does not need human intervention or operation.

The automated chest compression device of this invention can be used for any purpose of imposing a specific steady pressure and release on an external object; however, it was built and set up for the purpose of performing CPR. When it is setup for performing CPR, the automated chest compression device should adhere to the AHA's recommendations of compression rate and depth and is designed to maximize the success of CPR administration while minimizing risk and collateral damage to the patient.

Whereas a person performing manual CPR is instructed to position his/her palms directly on the sternum and is instructed by the AHA to expose the chest to locate the sternum, the automated chest compression device described herein does not require exposure of the chest and provides easier positioning practice of the pressure point by using a plate. This feature speeds up the start of the CPR and overcomes a bystander's potential hesitation to expose or touch the chest.

The automated chest compression device preferably comprises the following main components: a power unit (motor), a bracket element that supports the fixed parts mounted thereon, a variable power stroke actuator, a stroke actuator plate, and a linear rail.

In one embodiment, an automated chest compression device comprises a shaped actuator rotatably mounted about a shaft and a chest compression plate configured to move linearly based on the shape of the actuator, whereby, when the device is positioned against the chest of a patient in need of CPR, rotation of the actuator causes the chest compression plate to move linearly in a direction towards and away from the patient's chest and to thereby induce compression and to allow decompression, respectively, of the patient's chest.

In certain embodiments, the shape of the actuator determines a timing, a force and a depth of the linear movement of the chest compression plate and thereby also a timing, a force and a depth of the chest compression.

In certain embodiments, a first portion of the actuator engages with the chest compression plate during rotation of the actuator so as to exert pressure against the chest compression plate to thereby induce compression of the patient's chest. In certain such embodiments, the shape of the actuator is curved outward on the first portion. In certain such embodiments, the pressure exerted by the first portion of the actuator against the chest compression plate during rotation of the actuator is constant.

In certain embodiments, a second portion of the actuator does not engage with the chest compression plate during rotation of the actuator so as to exert no pressure against the chest compression plate to thereby allow decompression of the patient's chest. In certain such embodiments, the shape of the actuator is not curved outward on the second portion.

In certain such embodiments, a first portion of the shape of the actuator occupies a first segment of the actuator's rotation, and a second portion of the shape of the actuator occupies a second segment of the actuator's rotation, whereby the actuator engages with and exerts pressure against the chest compression plate during the first segment of rotation of the actuator to thereby induce compression of the patient's chest, and whereby the actuator does not engage with and exerts no pressure against the chest compression plate during the second segment of rotation of the actuator to thereby allow decompression of the patient's chest.

In certain embodiments, the shape of the actuator is curved outward on a first portion, such that the first portion of the actuator engages with the chest compression plate during rotation of the actuator so as to provide constant pressure against the chest compression plate to thereby induce compression of the patient's chest. In certain embodiments, the shape of the actuator is not curved outward on a second portion, such that the second portion of the actuator does not engage with the chest compression plate during rotation of the actuator so as to provide no pressure against the chest compression plate to thereby allow decompression of the patient's chest. In these embodiments, the first portion of the shape of the actuator occupies a first segment of the actuator's rotation, and the second portion of the shape of the actuator occupies a second segment of the actuator's rotation, whereby the actuator engages with and provides pressure against the chest compression plate during the first segment of rotation of the actuator, and the actuator does not engage with and provides no pressure against the chest compression plate during the second segment of rotation of the actuator.

In some embodiments, the first and second segments of the actuator's rotation are both approximately 180 degrees. In other embodiments, the first segment of the actuator's rotation is greater than 180 degrees, and the second segment of the actuator's rotation is less than 180 degrees, while in other embodiments, the first segment of the actuator's rotation is less than 180 degrees, and the second segment of the actuator's rotation is greater than 180 degrees. In still other embodiments, both the first and second segments of the actuator's rotation are less than 180 degrees, and one or more other segments of the actuator's rotation complete the 360 degrees of rotation.

Some other embodiments of the automated chest compression device comprise a rotating body situated between the actuator and the chest compression plate, wherein the rotating body controls lateral and/or frictional forces between the actuator and the chest compression plate.

In certain embodiments, the actuator and chest compression plate operate as a cam and follower mechanism, such that engagement of the actuator with the chest compression plate converts rotary motion of the actuator into linear motion of the chest compression plate. In some such embodiments, the axis of rotation of the actuator is substantially orthogonal to the direction of movement of the chest compression plate. In some such embodiments, the axis of rotation of the actuator is not at a center of area of the actuator.

In certain embodiments, at least one linear rail assists the chest compression plate to be level as the chest compression plate moves linearly towards and away from the patient's chest.

In some embodiments, the device comprises at least two actuators mounted to the shaft, each having a different shape that determines a timing and a force of the linear movement of the chest compression plate and thereby also a timing and a force of the chest compression, wherein each actuator can be alternatively selected by a user for use at a particular time.

In another embodiment, an automated chest compression device comprises a shaped actuator rotatably mounted about a shaft and a chest compression plate configured to move linearly, wherein engagement of the actuator with the chest compression plate converts rotary motion of the actuator into linear motion of the chest compression plate, and wherein the shape of the actuator determines the linear movement of the chest compression plate, whereby, when the device is positioned against the chest of a patient in need of CPR, rotation of the actuator causes the chest compression plate to move linearly in a direction towards and away from the patient's chest and to thereby induce compression of the patient's chest.

In certain embodiments, the axis of rotation of the actuator may be substantially orthogonal to the direction of movement of the chest compression plate, and/or the axis of rotation of the actuator may not be at a center of area of the actuator.

In some embodiments, the device comprises at least one linear rail that assists the chest compression plate to be level as the chest compression plate moves linearly towards and away from the patient's chest.

In some embodiments, the shape of the actuator is curved outward on a first portion, such that the first portion of the actuator engages with the chest compression plate during a first segment of rotation of the actuator so as to provide constant pressure against the chest compression plate during the first segment of rotation to thereby induce compression of the patient's chest. In some other embodiments, the shape of the actuator is not curved outward on a second portion, such that the second portion of the actuator does not engage with the chest compression plate during a second segment of rotation of the actuator so as to provide no pressure against the chest compression plate during the second segment of rotation to thereby allow decompression of the patient's chest.

In one embodiment, the variable power stroke actuator acts as a cam, the stroke actuator plate acts as part of a cam follower, and the linear rail acts as another part of the follower that connects the stroke actuator plate to the bracket. In another embodiment, the variable power stroke actuator is in at least partial contact with a customized cam-like profile, the stroke actuator plate is a free-moving linear reciprocal part of a cam follower, and the linear rail is another part of the follower that connects the stroke actuator plate to the bracket and allows the free unattached movement of the stroke actuator plate.

The force created by the power unit rotates the actuator, which pushes the stroke actuator plate that is adjusted to move in a linear direction and to make contact with the patient's chest so as to apply direct force (pressure) sufficient to compress the ribcage. At the maximum depth, which is the AHA guide depth, the pressure is released (mimicking the AHA guidance on administering manual CPR), disconnecting the actuator from the stroke actuator plate thereby enabling the ribcage to retreat naturally before the subsequent compression. The partial push motion of the pressure plate with the stroke actuator plate, along with the size, shape, and form of the actuator plate, reduce potential internal damage, and allow a "pressure free" decompression of the ribcage The motor rotation, measured by rotations per minute (RPM), is configured to deliver the number of compression cycles per minute, preferably based on current AHA guidance. As long as the power unit produces rotation, the device will perform compression, based on the characteristics of the power unit, for example, rotations per minute (RPM) or cycles per minute (CPM), output torque, fixed or variable rotation, and more.

The variable power stroke actuator delivers a pre-defined stroke profile (depth, pressure and duration) to compress the chest, and then, at the end of the power stroke, allows the patient's chest to expand naturally and without contact or pressure.

Different types of energy sources may be used to power the automated chest compression device's power-unit. In one embodiment, the automated chest compression device is powered by an electrical source. In other embodiments, the automated chest compression device may be powered by air-pressure or hydro-pressure.

For an electrical power unit, the power source can be an integrated battery, an external battery, or a converter from Alternating Current (AC) standard electricity, vehicle battery, and other energy sources that may be available. The automated chest compression device may be able to switch between sources of power to extend its operational time. For example, switching from using an integrated battery pack to a converter from a standard electricity power (115V or 230V).

Although a gearbox is not mandatory, a gearbox is another layer that can regulate the speed of the motor. Thus, if a predefined RPM can be guaranteed without using a gearbox, some embodiments of this apparatus may include a gearbox as a safety component, in order to maintain the rotation speed within range specified by the AHA.

The pressure motion with the patient's posture and surrounding conditions may result in vibrations that may jeopardize the stability of the CPR motion. The automated chest compression device includes one or more linear guide rails that prevent the undesired shift of the compression direction and that guarantee consistent, stabilized transfer of pressure from the automated chest compression device to the chest. These linear rails allow the device to be operated in various body positions, including when the patient is not prone, such as in a sitting position.

The power unit force is transferred to the pressure plate through an actuator with a customized profile, contour or shape. By changing the actuator to one with a different shape, the same device can deliver different outcomes. For example, one embodiment of the device has one actuator mounted within the device, the actuator having a pre-defined shape that is useful for delivering a specific CPR compression pattern, e.g., to adults. Another embodiment of the device has a set of differently-shaped actuators mounted within the device from which one actuator can be selected for use during a particular CPR operation, where each of the actuators with a different profile will provide a different CPR compression pattern and yield a different CPR outcome, such as CPR for different ages, vibration to release blood clots, flattening bumps, and more.

Some embodiments may allow the user to select the compression profile, namely depth, pressure and duration of the compression, where the profile is defined as the ratio (time) and depth at which the pressure is applied to the chest vs. movement without depth or pressure application, i.e., the time allowing for natural expension of the chest. Such an option enables the apparatus to be adapted to body shape, size, or position.

The apparatus can be used for different types of CPR (e.g., adults or children) or as a multi-function device for another function besides CPR that requires repeated compression forces. With just small of adjustments, the apparatus can be customized for non-CPR purposes, for example, pressure with vibration, inconsistent pressure motion, and more.

The automated chest compression device may include safety features (Alert, Pause, Stop, or Release) to address either deliberate deactivation, malfunction that jeopardizes the efficiency of the CPR, or any other reason for discontinuing the CPR, such as if the patient regains heartbeat.

At any point during CPR delivery, the caregiver can choose to suspend CPR administration for a few seconds, observe the patient's chest for movement, check for heartbeat, fine-tune any adjustment for CPR delivery optimization if needed, or stop administering CPR if the patient is breathing on his/her own, or any other kind of emergency. In one embodiment, the automated chest compression device has a rest/stop setting that will bring the compression plate stroke-actuator-plate to the state at the top of the cycle, i.e., no power to the actuator and no pressure on the pressure plate, which eliminates the risk of preventing the patients from breathing on their own.

Some embodiments include a sensor that, in real-time, monitors the efficiency of the CPR and provides information to a real-time response-unit. Some embodiments include a real-time response unit that may activate an alert, pause, or emergency stop and release if the CPR fails to meet the minimum level of efficient CPR. For example, such an event may include an emergency stop by the real-time response unit, which may be accompanied by an audiovisual alarm option.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The principles and operation of the system and method according to the present invention may be better understood with reference to the drawings and the following description, it being understood that these drawings are given for illustrative purposes only and are not meant to be limiting, wherein.

Figure 1:
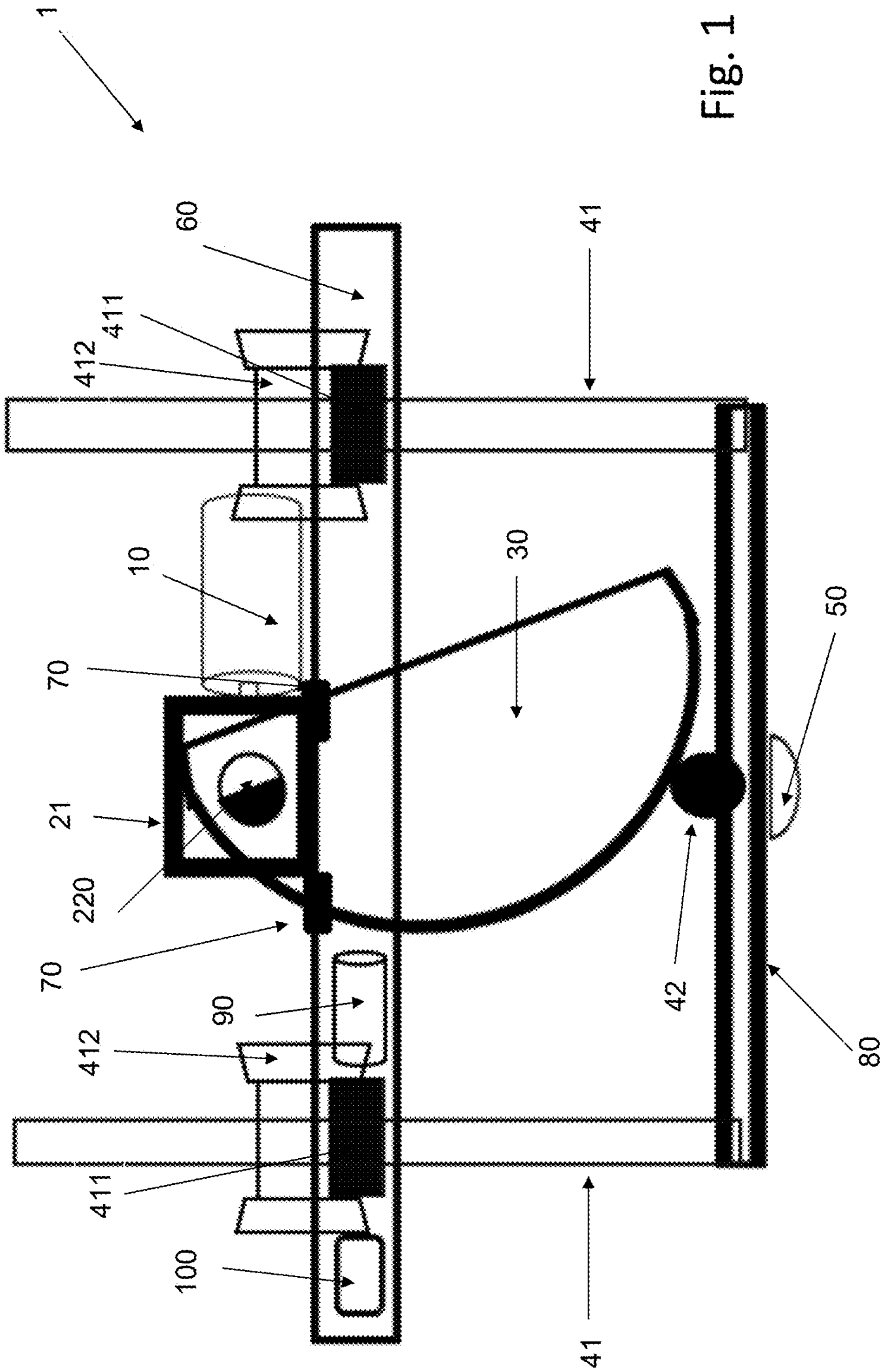
FIG. 1 is a schematic illustration of one embodiment of the automated chest compression device of the present invention in a random state of a compression cycle.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

The following preferred embodiments as exemplified by the drawings are illustrative of the invention and are not intended to limit the invention as encompassed by the claims of this application.

A typical automated CPR apparatus in the prior art includes two main components that operate together, namely an automated chest compression device and a positioning device. Some automated CPR devices embed the two components together as one apparatus for the purpose of delivering CPR. The automated chest compression device described herein has separated the positioning device from the automated chest compression unit. This separation enables an owner of an existing automated CPR device to replace the compression unit with the one described herein, while continuing to use the existing positioning device.

FIG. 1 shows a schematic illustration of one embodiment of the automated chest compression device for use with a positioning apparatus or frame without showing the positioning device with which it would be used. FIGS. 1*a-d* show, in isolated views, details of certain components of the automated chest compression device 1 that are shown more broadly in FIG. 1.

The automated chest compression device disclosed herein may be mounted, either fixedly or interchangeably, on a positioning device that allows the automated chest compression device to be positioned against a patient's chest for use in CPR. While certain components shown in FIG. 1 may give the appearance of a "frame" shape, this frame shape should not be confused with a positioning apparatus on which this automated chest compression device will be mounted. The automated chest compression device is capable of being used with any positioning apparatus, as long as it is able to stably positioning of the automated chest compression device above the center of the patient's chest, without adding pressure to the chest, and providing counter-pressure on the patient's back, i.e., opposite the chest.

As shown in FIG. 1, the automated chest compression device 1 includes a variable power stroke actuator 30 and a free-moving stroke actuator plate 80 that moves, in some embodiments in combination with certain motion stabilizers, to apply pressure to a patient's chest in a specific pressure delivery pattern in accordance with the shape and profile of the variable power stroke actuator 30. In the embodiment shown in FIG. 1, the motion stabilizers include one or more linear rails 41 to regulate motion of free-moving stroke actuator plate 80.

One embodiment of the invention uses a modified or customized cam-and-follower mechanism to achieve the desired reciprocating motion for the purpose of compression. In general, a cam is a rotating member, such as a specifically-profiled disc, cylinder or sphere that is mounted on a shaft, and the follower is a reciprocating member, such as a lever, whose motion is influenced by the specific shape or profile of the rotating cam. This mechanism is used to convert rotary motion of the cam into linear motion of the follower: as the cam rotates, the follower falls into a process known as reciprocating linear motion. In this case, the rotating cam produces a reciprocating follower motion in a planned direction that is substantially perpendicular, or orthogonal, to the axis of rotation, resulting in a compression motion and a decompression motion of the patient's chest.

In particular, in the embodiment shown in FIG. 1, the variable power stroke actuator 30 acts as a modified cam, and the stroke actuator plate 80 acts as a modified follower. As described below, the variable power stroke actuator 30 has a specific profile or shape whose rotation about an axis of rotation gives the stroke actuator plate 80 a specifically timed and sequenced linear motion, e.g., in a direction that is perpendicular, or orthogonal, to the axis of rotation of actuator 30, and delivers a particular chest reciprocating compression.

In the embodiment shown in FIG. 1, in which the automated chest compression device 1 is shown in a random stage of its operation, the variable power stroke actuator 30 has a specific shape or contour that enables its particular function/behavior, as described in greater detail below. In the embodiment shown, the variable power stroke actuator 30 has a generally semicircular or half-moon shaped profile, although, as discussed below, such as with reference to FIG. 4, the variable power stroke actuator 30 can have a profile with a different shape. In either case, as a direct result of its specific profile, rotation of variable power stroke actuator 30 allows the stroke actuator plate 80, as guided by rails 41, to be moved in a specific linear motion.

Some embodiments may also include one or more elements to reduce or control lateral forces and/or friction, such as by the use of a small wheel or roller. In one embodiment, a controlled friction power converter 42 may be a round, rotating body that sits on the plate and provides low friction power transfer from variable power stroke actuator 30 to stroke actuator plate 80. In a preferred embodiment, controlled friction power converter 42 is substantially directly under or in line with, i.e., not substantially offset from, the axis of rotation of variable power stroke actuator 30, so as to avoid or reduce undesirable side or lateral forces during rotation of variable power stroke actuator 30. In another embodiment, the controlled friction power converter 42 may not be present but its function may be performed by a slider, which may either be a separate piece or as part of element 80 or the variable power stroke actuator 30.

The automated chest compression device 1 also includes the use of a power delivery unit 10, which, in the embodiment of FIG. 1, is an electrical motor 10 with a reduction gear box 21 and the outlet of the rotation through the rotation shaft 220. As shown in FIG. 1, variable power stroke actuator 30 is rotatably mounted on the motor rotation shaft 222 (hidden in FIG. 1 but shown in FIG. 1*a*) that is coupled to the reduction gear box 21 via rotation shaft 220. In the embodiment of FIG. 1, shaft 220 is preferably mounted such that its axis of rotation is orthogonal to the direction of compression, in order to optimize the transfer of rotational force of the motor to linear compression force. In other embodiments, shaft 220 can be mounted such that its axis of rotation is not orthogonal to the direction of compression.

In another embodiment of this invention, rotation is used directly in order to minimize energy loss. Specifically, in this other embodiment, the gearbox, which consumes energy, is not included. In the embodiment shown in FIG. 1, however, the gearbox assists in regulation of the rotation speed as a safety mechanism.

While the apparatus in this embodiment uses a rotation output of the power unit, as power-unit 10 demonstrates, other embodiments may have a pneumatic or hydraulic motor, or may use other of sources of energy, that, in most cases, push a piston to rotate a crankshaft. In all embodiments for the purpose of CPR, the rotation cycles should preferably yield the number of compressions per minute that meet the AHA's current guidelines (CPM).

In the embodiment shown in FIG. 1, electrical motor 10 rotates shaft 220 and attached variable power stroke actuator 30 about the axis of shaft 220. In the embodiment shown in FIG. 1, electrical motor 10 rotates variable power stroke actuator 30 in a clockwise rotation shaft 220. In another embodiment, the elements may be arranged as mirror-images of the illustrations shown herein, wherein electrical motor 10 rotates shaft 220 and attached variable power stroke actuator 30 in a counterclockwise direction about the axis of shaft 220.

In the embodiment shown in FIG. 1, variable power stroke actuator 30 is mounted to shaft 220 off the center of actuator 30 so that it rotates eccentrically about shaft 220. In other words, shaft 220 is attached to actuator 30 not at the centroid or center of area of actuator 30.

Figure 1A:
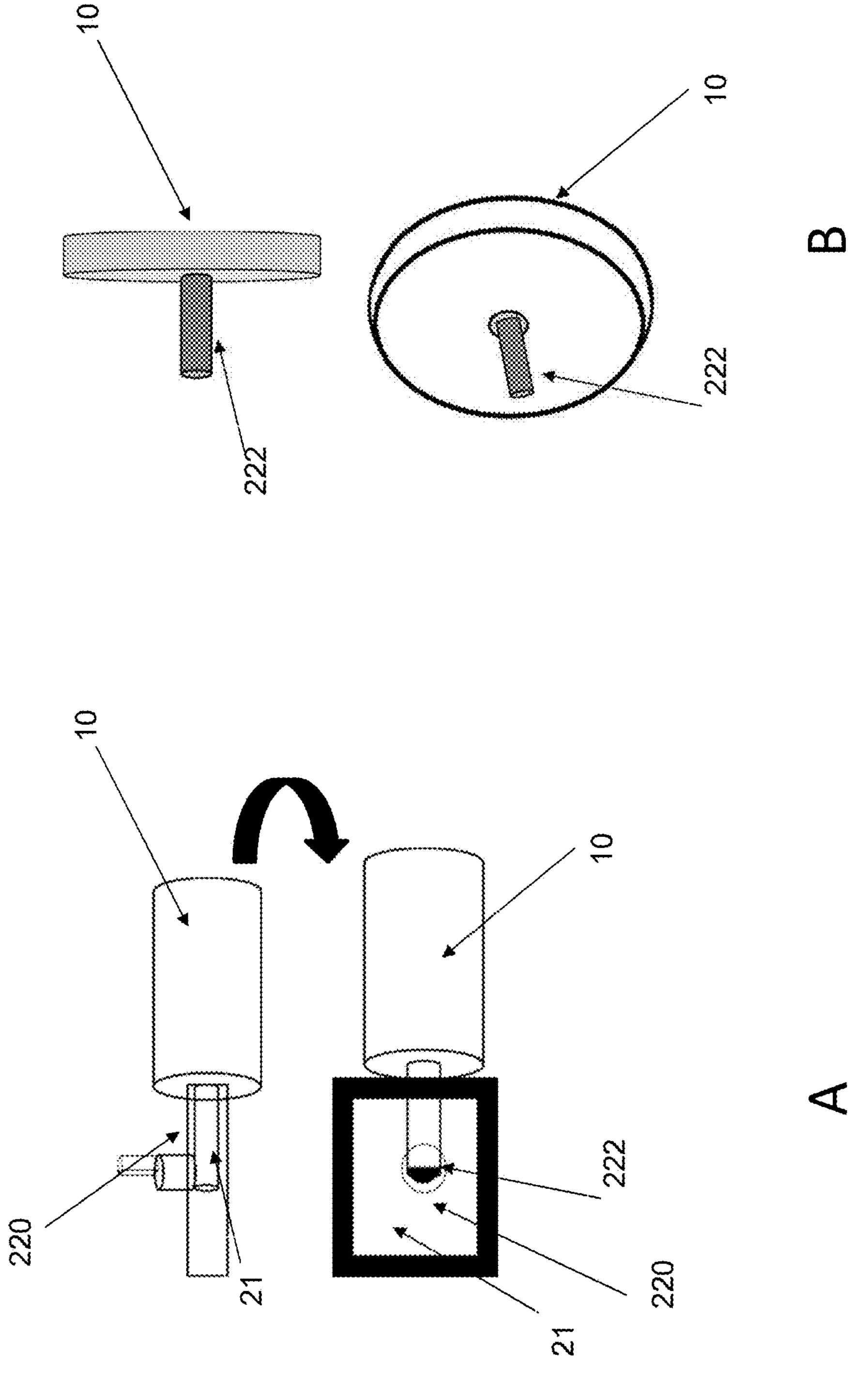
FIGS. 1*a*, 1*b*, 1*c* and 1*d* are schematic illustrations that focus on specific components of the automated chest compression device shown in FIG. 1.

FIG. 1*a* shows details of the components of the overall power unit 10 in the embodiment of FIG. 1, and demonstrates a way to provide the variable power stroke actuator 30 with rotation strength. As shown in subdrawing A, electrical motor 10 has a central motor rotation shaft 222, which goes into the reduction gear box 21 and rotates 90 degrees with the output rotation shaft 220. The rotation shaft 220 may have a half-round axis that enables torque to the rotation of the variable power stroke actuator 30 through the rotation shaft hole 22. Other embodiments may have a full round axis with other ways to enable torque, such as a through-pin, screw, or other options. In one embodiment, the power unit as a whole is connected to bracket 60 through motor-to-frame mounts 70, as seen in FIG. 1. Subdrawing B shows that electrical motor 10 can be in the form of a pancake motor in an alternative embodiment.

As shown in FIG. 1, power unit (motor) 10, through motor-to-frame-mounts 70, is mounted to a bracket or chassis 60. In this embodiment, bracket 60 is a part of the device that enables the various parts to operate stably and harmoniously. In the embodiment of FIG. 1, bracket 60 is shown as part of the automated chest compression device 1 and will be attached to a CPR positioning structure or frame. Alternatively, if the CPR positioning structure or frame has the necessary components, such as holes or linear guide openings 411 (if needed) for the linear rails 41, and a motor or placing board for the motor, then bracket 60 may not be necessary.

FIG. 1 illustrates an interface of the location and function of the power unit's RPM and torque with the stroke actuator plate 80 via the variable power stroke actuator 30. In operation, as motor 10 causes actuator 30 to rotate via shaft 220, the automated chest compression device 1 delivers chest compressions to the patient. Specifically, the stroke actuator plate 80, and particularly the chest pressure plate 50 that is attached to stroke actuator plate 80, are placed against the patient's chest. Using the outcome of the motor 10, rotation of the rotor in the rotation shaft element 220 causes a circular motion of the variable power stroke actuator 30. The variable power stroke actuator 30, as it rotates, contacts the stroke actuator plate 80, either directly or through controlled friction power converter 42. The circular motion of actuator 30 is translated into a linear motion of the stroke actuator plate 80, and of the chest pressure plate 50 that is attached thereto, by the controlled friction power converter 42, forcing stroke actuator plate 80 and chest pressure plate 50 to move in a linear direction, namely in the direction against the patient's chest, guided by linear rails 41.

When the patient is lying flat, i.e., the patient's chest is directly above the patient's spine, the linear motion of stroke actuator plate 80 in the direction towards the patient's chest is substantially vertical so as to compress the patient's chest towards the patient's spine. However, in certain circumstances, the conversion of rotation to linear motion is subject to potential side forces. For example, if the patient is not lying flat or is seated, or if the surface upon which the patient is positioned is not flat, the gravity vector may affect the linear motion of stroke actuator plate 80 in the direction against the patient's chest and may reduce the efficiency of the chest compressions.

In order to prevent this from occurring, the automated chest compression device 1 may include one or more stabilizers that prevent the undesirable gravity effect that can reduce the efficiency of the chest's compression toward the spine. In one embodiment, FIG. 1 shows one or more linear rails 41 that stabilize the motion of stroke actuator plate 80 and guarantee a level, linear motion of stroke actuator plate 80 with minimum vibration. In one embodiment, as shown in FIG. 1, each of the one or more linear rails 41 is fixedly mounted to the stroke actuator plate 80 and moves freely and slides through a linear guide opening 411 in bracket 60, assisted by the linear guide 412, which restricts the angular or rotational movement of linear rail 41 and thereby also of stroke actuator plate 80. This structure allows operation of the device independent of gravity, allowing its use on a patient in a sitting position as well in a supine position.

In a first alternative embodiment (not shown), each of the one or more linear rails 41 is fixedly mounted to the stroke actuator plate 80 and may have a longitudinal linear guide opening therein that accommodates bracket 60 as linear rails 41 moves relative thereto and stabilizes the linear motion of stroke actuator plate 80. As opposed to the embodiment shown in FIG. 1, in which linear rails 41 move relative to bracket 60 via holes, or linear guide openings 411, in bracket 60 through which the linear rails 41 pass, this alternative embodiment contemplates movement of linear rails 41 relative to bracket 60 via linear guide openings in linear rails 41 through which bracket 60 passes. However, this in this embodiment, the linear guide openings in linear rails 41 would be elongated so as to allow bracket 60 to move therealong through linear rails 41.

In a second alternative embodiment (not shown), each of the one or more linear rails 41 is fixedly mounted to bracket 60 and may have a longitudinal linear guide opening therein that accommodates stroke actuator plate 80 as it slides therealong and has its linear motion stabilized. As opposed to the embodiment shown in FIG. 1, in which linear rails 41 move relative to bracket 60 via holes, or linear guide openings 411, in bracket 60 through which the linear rails 41 pass, this alternative embodiment contemplates movement of stroke actuator plate 80 relative to linear rails 41 via linear guide openings in linear rails 41 through which stroke actuator plate 80 passes. However, this in this embodiment, the linear guide openings in linear rails 41 would have to be elongated so as to allow stroke actuator plate 80 to move therealong through linear rails 41.

Figure 1B:
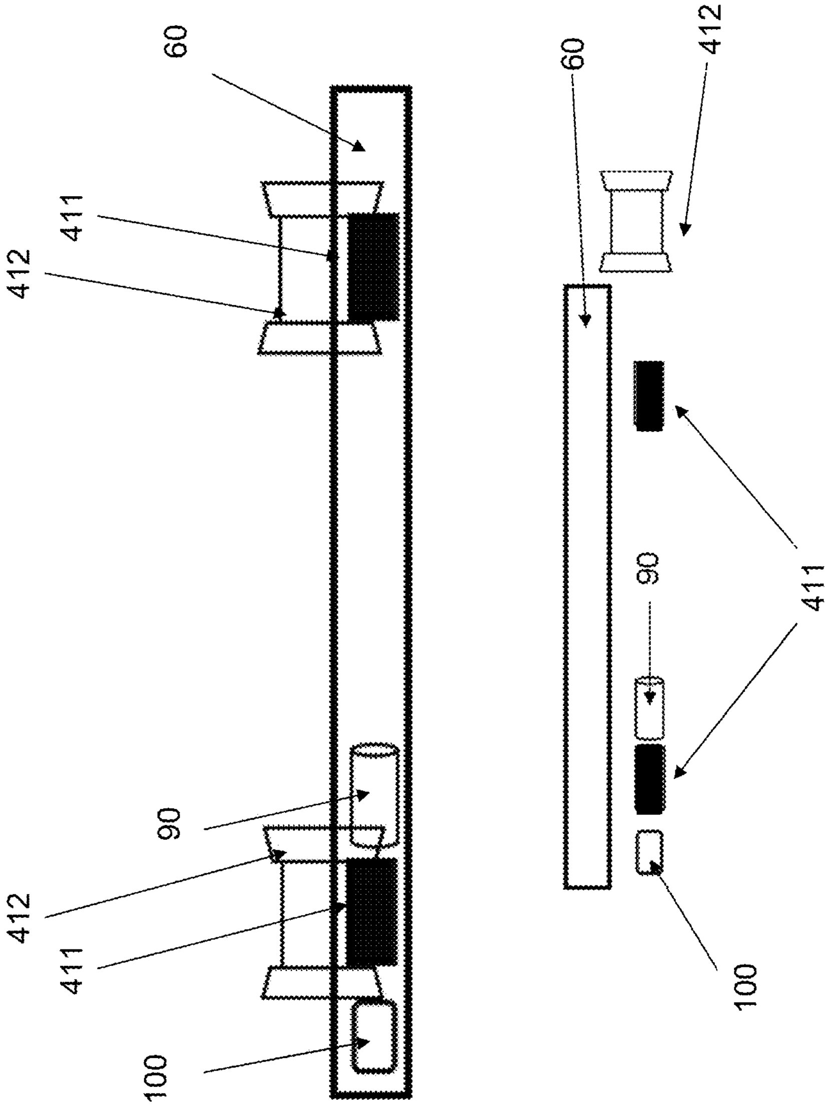

FIG. 1*b* provides a detailed view of the main components of the bracket or chassis 60 in the embodiment of FIG. 1. Bracket 60 can be any structure in any shape as long as it enables the rotating function of the variable power stroke actuator 30 in a manner that results in linear motion of the stroke actuator plate 80, as illustrated in FIG. 1. Bracket 60 has a rigid part that functions as the host of the power-unit element 10, i.e., onto which power-unit element 10 is mounted. Bracket 60 also has an embedded or adaption option for being mounted on a CPR positioning frame, as shown generally in FIG. 3*b*. Its positioning relies on the ability of the CPR positioning frame to enable positioning the chest pressure plate 50 as close as possible to the center of the patient's chest and to allow the stroke actuator plate 80 to make contact with the patient's sternum.

Bracket 60, in one embodiment, may also function as a platform for accessories such as a real time sensor 90 and real time response unit 100 (described hereinbelow). Furthermore, as described below, bracket 60 includes elements that stabilize the motion of chest pressure plate 50 and soften the friction both on bracket 60 and on stroke actuator plate 80.

Bracket 60, in one embodiment as shown in FIG. 1*b*, may include one or more linear guide openings 411, generally corresponding to the number of linear rails 41. The linear guides 412 are positioned about linear guide openings 411 and enable the linear rails 41 to move freely and smoothly through bracket 60, and by that stabilizing the push of the stroke actuator plate 80 that moves to cause the chest compression and decompression, minimizing potential vibration. In preferred embodiments, it is important to minimize the size and weight of bracket 60 and the number of linear rails 41, without losing ridgidity, stability and functionality.

Figure 1C:
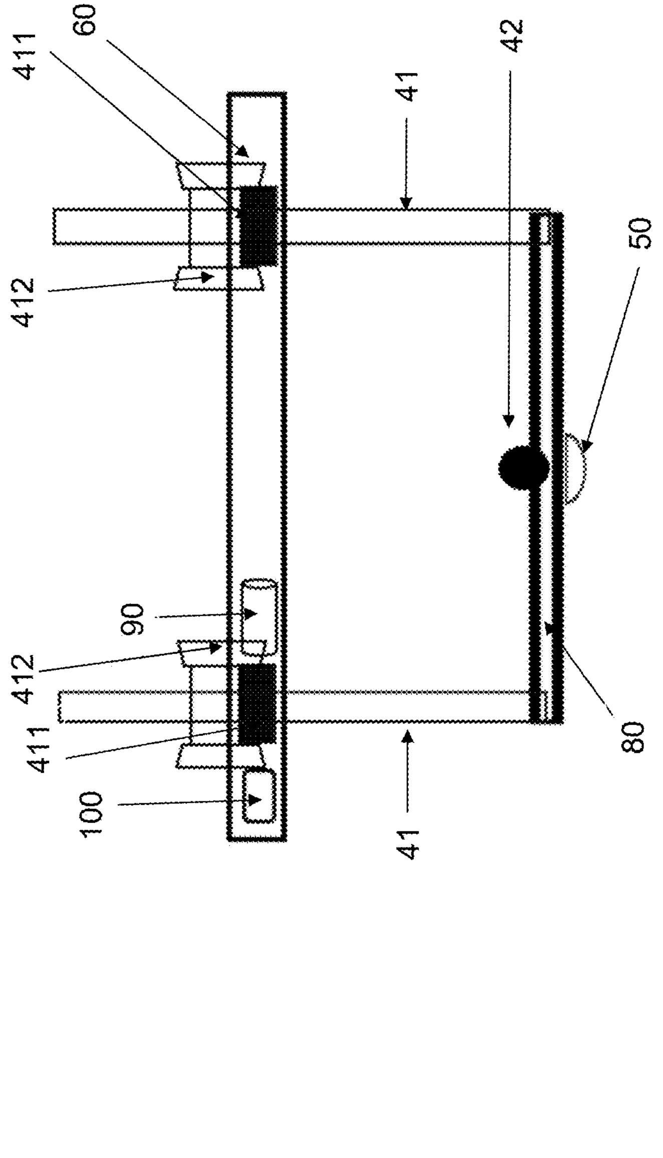

FIG. 1*c* illustrates the automated chest compression device 1 of FIG. 1 without motor 10 and actuator 30 attachments, clearing the view of the assembly of bracket 60, the linear guides 41 and the elements to contact the patient's chest. In this embodiment, two linear rails 41 are shown, although other embodiments may use only one or more than two. As described previously, rails 41 allow stroke actuator plate 80 to move relative to bracket 60 in a straight direction, and keep stroke actuator plate 80 level, without (or minimizing) the torque tilt that may result from the rotation moment of the variable power stroke actuator 30. In certain embodiments, linear rails 41 ensure that the stroke actuator plate 80 will be positioned to meet the actuator 30 and the patient's chest while adding stability to the motion between them. Linear guide opening 411 and linear guide 412, one or more of each, serve to stabilize the motion of the stroke actuator plate 80 toward the patient's spine. In addition, because, according to the AHA, CPR is supposed to be delivered by multiple compressions per minute (as of now, between 100 to 120 times), the compression frequency might vibrate the automated chest compression device, especially when the CPR is administered in other than the supine body position, and so linear rails 41 stabilize the entire automated chest compression device, guaranteeing efficient chest compression and decreasing energy loss, by reducing the rotation torque.

FIG. 1*c* illustrates the leveling and stabilizing relationship between linear rails 41 and stroke actuator plate 80. The linear rails 41, along with the controlled friction power converter 42, guide, smooth and stabilize the motion of stroke actuator plate 80 from the bracket 60 to the patient's chest and then compress the chest toward the spine.

FIG. 1 illustrates a CPR implementation of the automated chest compression device 1 where the stroke actuator plate 80 with the chest pressure plate 50 contacts the patient's exposed or dressed chest. According to the AHA guidance, the focus of CPR compression should be the patient's sternum, due to the efficiency of chest compression through a single point of contact. However, an untrained bystander who operates the CPR device under time pressure or other surrounding conditions may have difficulty locating the patient's sternum in a timely matter. Thus, the stroke actuator plate 80 has enough surface area to capture the tips of the ribcage so as to start the compression as fast as possible and still achieve efficient CPR. The gradual pressure strokes caused by the variable power stroke actuator 30 will slide the chest pressure plate 50 toward the patient's sternum, even if the chest pressure plate 50 was mis-placed at the beginning of the CPR and misaligned with regard to the patient's sternum.

When the stroke actuator plate 80 makes contact with the patient's chest, and pressure is applied to the stroke actuator plate 80, the ribcage gives in to the pressure from the stroke actuator plate 80 and is compressed. Stroke actuator plate 80 delivers the requisite compression via chest pressure plate 50, which allows the compression force to be delivered with pinpoint focus to the patient's chest. After the actuator 30 passes its final touch to the stroke actuator plate 80, the stroke actuator plate 80 is released from the pressure, and the variable power stroke actuator 30 continues its rotation back toward its starting position. The detachment of the stroke actuator plate 80 from the patient's chest allows the patient's chest to retreat naturally and to expand, thereby pushing stroke actuator plate 80 in the opposite direction of the compression.

Figure 1D:
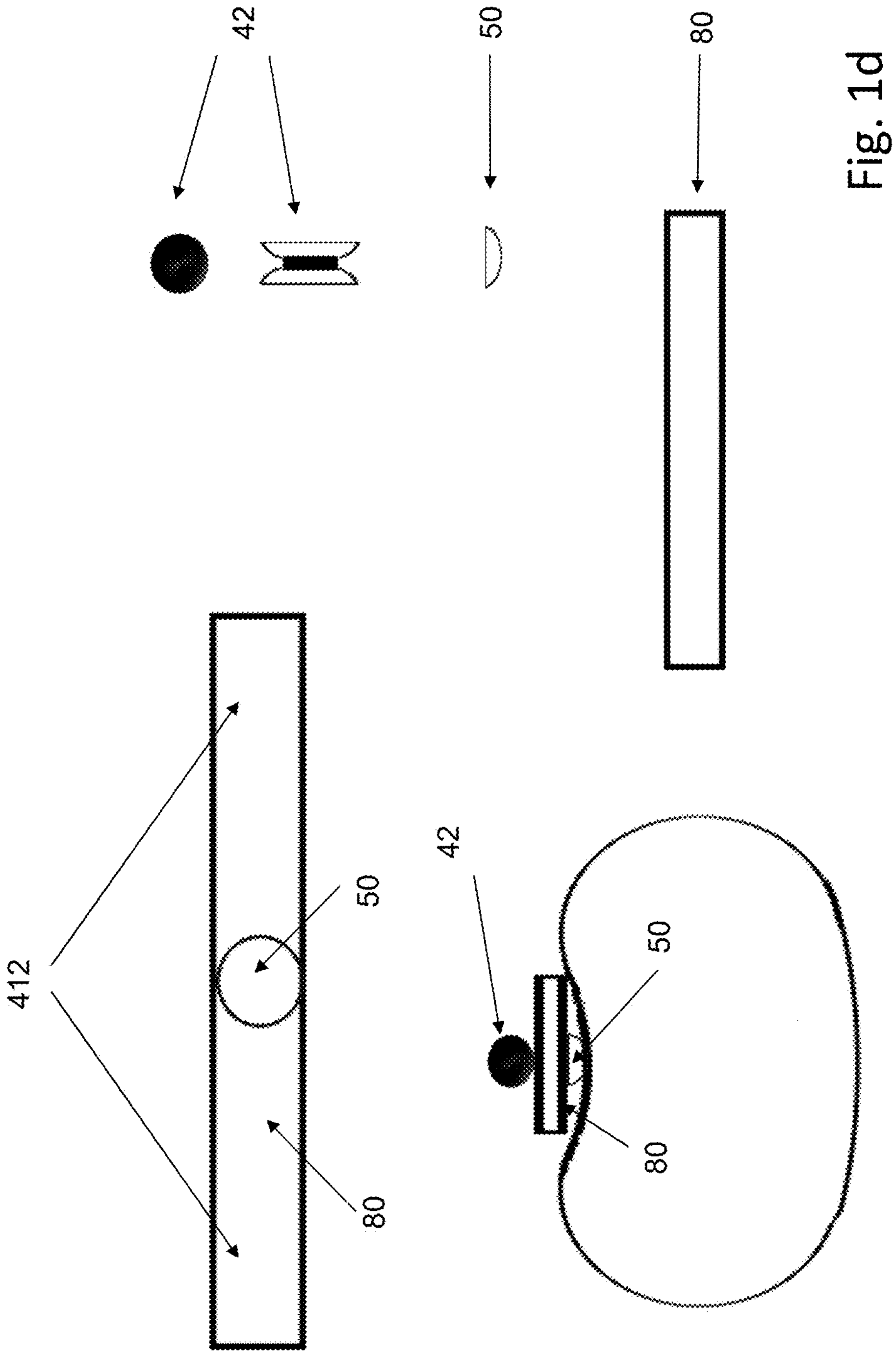

FIG. 1*d* provides a detailed view of the parts of automated chest compression device 1 that touch the patient's chest. They convert the pressure from variable power stroke actuator 30, powered by the power unit 10, into a linear pushing force by stroke actuator plate 80 to press the chest toward the spine. After stroke actuator plate 80 reaches the maximum compression depth, set by the size, shape and contour, i.e., the profile, of variable power stroke actuator 30, the pressure from variable power stroke actuator 30 is released. However, the chest pressure plate 50 and stroke actuator plate 80 may not be immediately withdrawn from against the patient's chest but rather continue to touch it, and will move back toward their initial position along with the chest, as the chest recoils/decompresses naturally (without pressure).

As shown in FIG. 1, in a preferred embodiment, stroke actuator plate 80 is generally free-moving in a linear direction, in that its motion is not restrained or constrained by any attachment to bracket 60. As such, the motion of stroke actuator plate 80 is dictated only by the profile of variable power stroke actuator 30. Thus, while stroke actuator plate 80 moves linearly towards the patient's chest due to force created during the rotation of variable power stroke actuator 30, stroke actuator plate 80 is not withdrawn from the patient's chest due to force created or removed during the further rotation of variable power stroke actuator 30 but rather remains against the patient's chest, without exerting any pressure thereagainst, until pushed back toward its initial position as the chest naturally recoils/decompresses. In an alternative embodiment (not shown), stroke actuator plate 80 is attached by a spring, preferably with low tensile forces, to frame 60 that allows the free linear motion of stroke actuator plate 80 towards the patient's chest upon pressure from variable power stroke actuator 30 and promotes the linear motion of stroke actuator plate 80 away from the patient's chest once pressure from variable power stroke actuator 30 is removed.

In one embodiment, as shown in FIG. 1*d*, the stroke actuator plate 80 is flat and wide enough to capture the tips of the ribs, as demonstrated in relation to a chest profile on the bottom left of the FIG. 1*d*, and the chest pressure plate 50, which is a shaped absorbing cushion that can fill in the gap between the patient's ribs where the ribs join to the sternum, is attached to stroke actuator plate 80. Pressure plate 50 also functions as a fender to cushion the impact of the pressure against the patient's chest. FIG. 1*d* illustrates how the combination of stroke actuator plate 80 and chest pressure plate 50, with the controlled friction power converter 42, are placed on a human chest and demonstrates the relative sizes of the stroke actuator plate 80 and a human's chest. FIG. 1*d* shows a human upper torso in cross-sectional view, emphasizing the chest area. This combination enables the device 1 to function as required by the AHA, even with the presence of clothes on the patient, and even if the chest pressure plate 50 is not perfectly located on the patient's sternum as most, if not all, prior art requires.

One of the main advantages of the automated chest compression device as disclosed herein is its ability to moderate the trauma to the patient's chest that would otherwise be caused by a blow or a brutal push. This is done by using the rotation of a shaped actuator 30 that is designed such that, when the actuator 30 re-engages with the operating plate 80 after they were separated during decompression of the patient's chest, the actuator 30 begins with a contact that is directed at an angle of less than 90 degrees due to the rotational movement of the designed actuator 30 (not as a linear movement that is a characteristic of a piston). Continued rotation of the designed actuator 30 produces a continuous thrust that compresses the chest with a customized and optimized pressure. This achievement is due to the combination of shape, thickness, edge design, and strength (profile) of the variable power stroke actuator 30.

Variable power stroke actuator 30 and controlled friction power converter 42 convert the rotation motion from the shafts, namely motor rotation shaft 222 and rotation shaft 220, into a linear motion of the stroke actuator plate 80 from bracket 60 in a direction toward the patient's spine. Following the AHA guidance, the rotation is done in a certain PCM (Pressure Cycles per Minute, currently between 100 to 120). The motion has the resistance of the chest/ribcage.

Figure 2A:
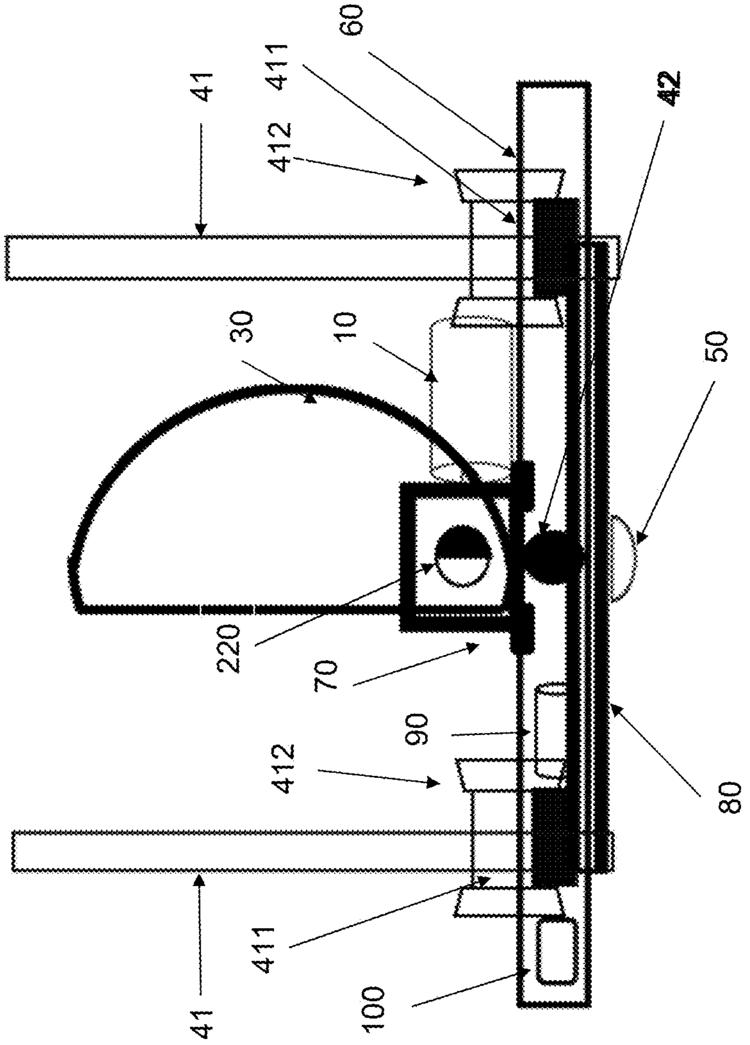
FIGS. 2*a* and 2*b* are schematic illustrations of two positions of the embodiment of the automated chest compression device shown in FIG. 1 in its extreme states that illustrate the device's range of motion.
Figure 2B:
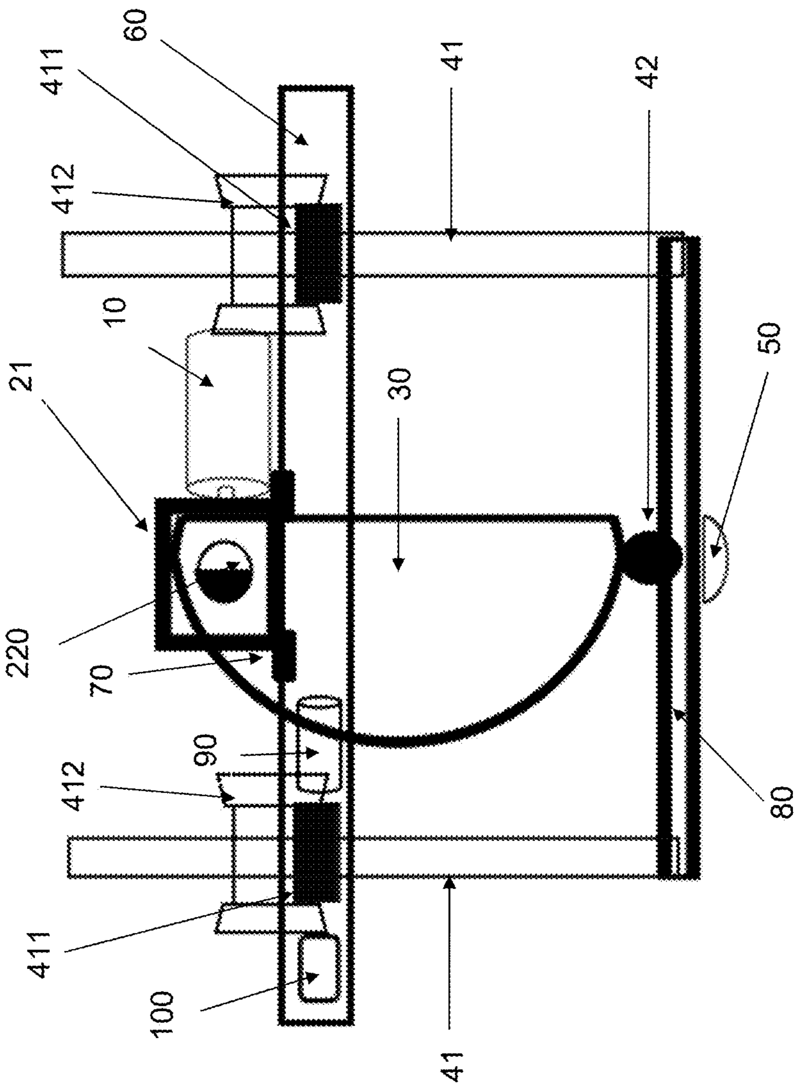

FIGS. 2*a* and 2*b* are schematic illustrations of two positions of the embodiment of the automated chest compression device shown in FIG. 1 in its extreme states that demonstrate the range of motion of device 1 at two main stages of its operation, with FIG. 2*a* showing the device at the beginning of the compression sequence, namely at the chest relaxing point, and FIG. 2*b* showing the device at the maximum depth of chest compression.

FIG. 2*a* illustrates the range of motion of the automated chest compression device in the initial state, where the stroke actuator plate 80 lightly touches the patient's chest just before the compression begins. The stroke actuator plate 80 location may fluctuate because, after the first compression, the chest may not recoil to the maximum capacity of the lungs. Therefore, after an initial compression, the ribcage may be lower than in natural breathing or its level at the beginning of the CPR.

Figure 3A:
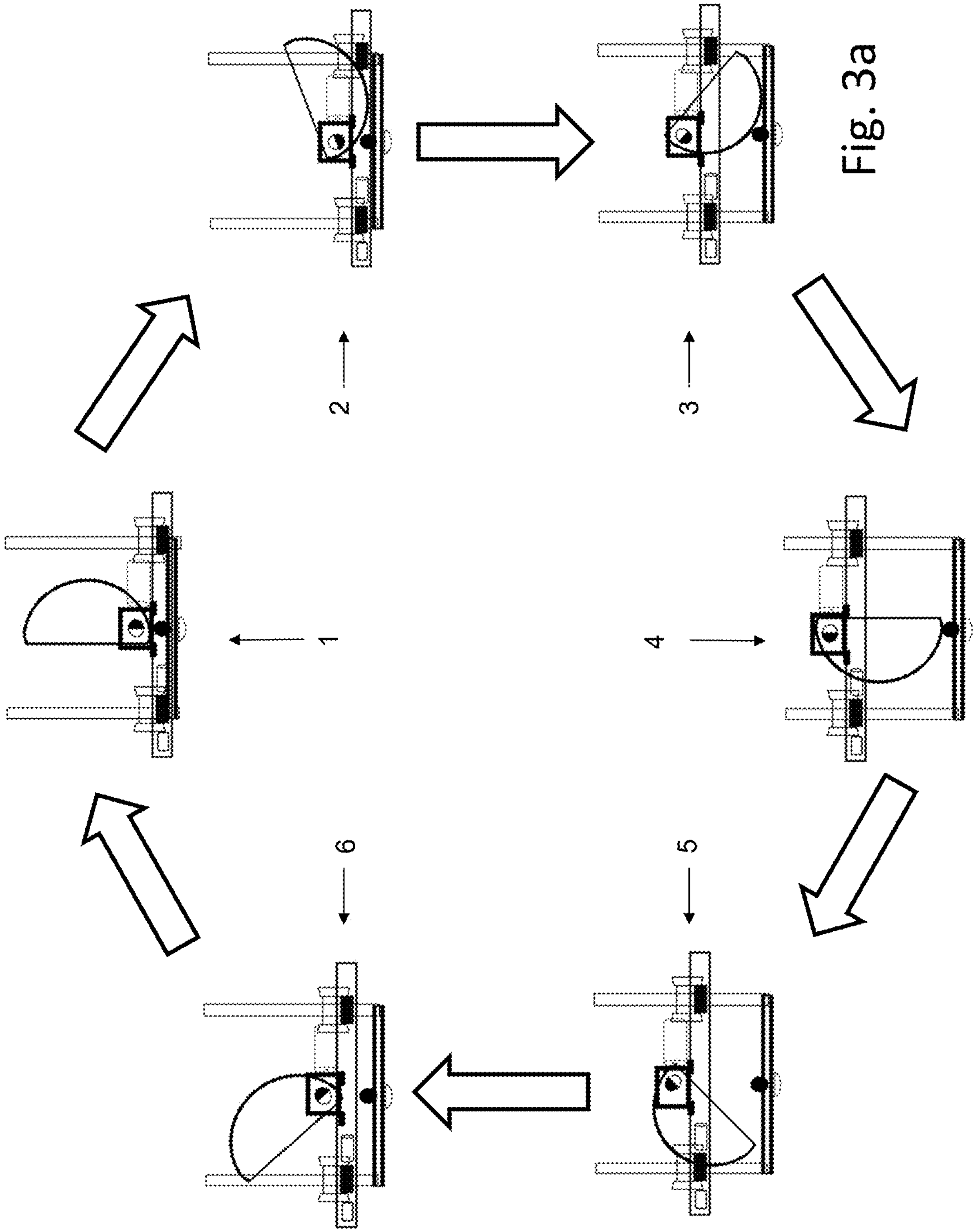
FIGS. 3*a* and 3*b* are two different schematic illustrations of the automated chest compression device of the present invention through the variable power stroke actuator cycle.
Figure 3B:
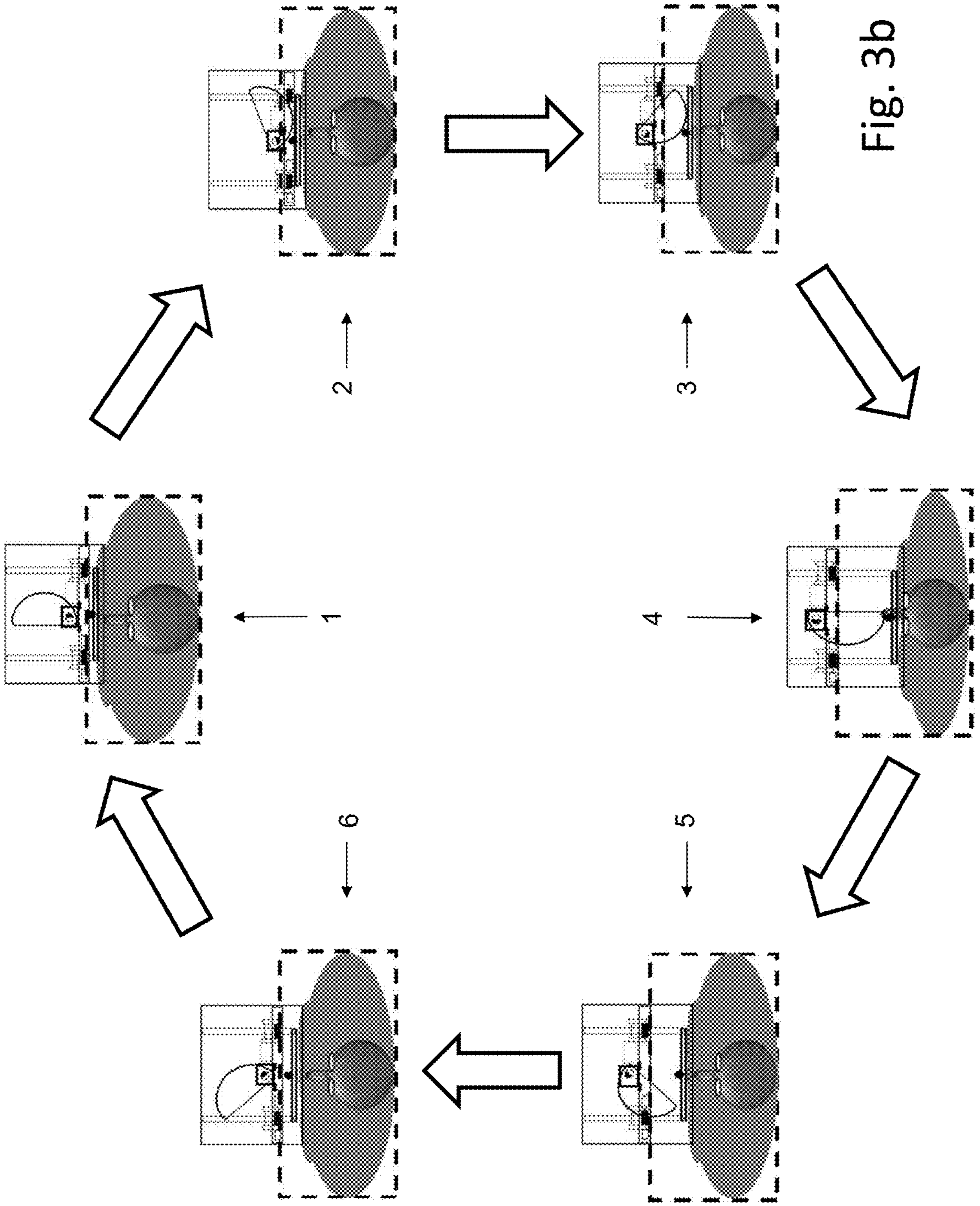

FIG. 2*a* illustrates the state of the automated chest compression device 1 at the beginning point of the variable power stroke actuator 30 rotation, which is orientation of actuator 30 at the most chest-relaxed location of the stroke actuator plate 80 on the patient's chest, namely having light contact with the patient's chest. (The same concept is illustrated in FIGS. 3*a* and 3*b*, wherein position 1 provides the context of the specific stage with regard to the rotation sequence of the actuator 30.) In FIG. 2*a*, actuator 30 has not yet begun its rotation, and so stroke actuator plate 80 is barely pressed against the patient's chest, providing no compression. This is the starting point of the CPR by the automated chest compression device 1. It follows the operator setting the size of the positioning device to meet the patient's chest size and to position the stroke actuator plate 80 against the patient's chest without administering any pressure.

FIG. 2*b* illustrates the range of motion of the automated chest compression device 1 at the maximum depth status, i.e., where the stroke actuator plate 80 reaches the maximum extension/depth (according to the AHA guidance) of the chest. Thus, FIG. 2*b* demonstrates the end-point of the compression, which in the illustrated embodiment, is a 180 degrees rotation of variable power stroke actuator 30 from its position in FIG. 2*a* and provides the maximum compression of the patient's chest, as set by the specific profile of variable power stroke actuator 30. In FIG. 2*b*, actuator 30 has been rotated 180 degrees, and so stroke actuator plate 80 is fully pressed against the patient's chest, providing full compression. (The same concept is illustrated in FIGS. 3*a* and 3*b*, wherein position 4 provides the context of the specific stage with regard to the rotation sequence of the actuator 30.)

FIGS. 3*a* and 3*b* show two different schematic illustrations of the automated chest compression device 1 through the complete 360° rotation motion of the variable power stroke actuator cycle. The transition of actuator 30 from FIG. 2*a* to FIG. 2*b* and back to FIG. 2*a* is shown in FIGS. 3*a* and 3*b*. FIG. 3*a* shows the motion of the device only, and FIG. 3*b* shows the device with reference to a patient's body and set in place on the patient's using a positioning device.

As described below, FIGS. 3*a* and 3*b* show how the variable power stroke actuator 30 rotates and pushes the stroke actuator plate 80 in a linear motion. FIG. 3*a* focuses on the parts of the automated chest compression device 1 itself, while FIG. 3*b* demonstrates the relationship between the parts of the automated chest compression device and the patient's body, mainly the chest. FIG. 3*b* illustrates the positions of the automated chest compression device 1 of FIG. 3*a* as if those positions occur when the automated chest compression device is mounted on a positioning frame, namely with an imaginary positioning frame and hypothetical chest compression and decompression. FIG. 3*b* also demonstrates that the automated chest compression device is not a standalone apparatus when it provides CPR, as it needs to be positioned against the patient using another device, such as a positioning apparatus, and also it needs a counterforce to the chest compression on the patient's back.

In FIG. 3*a*, Position 1 is the position of the automated chest compression device 1 in its initial position, as well as its last position, of the compression/release cycle, as described in FIG. 2*a*. At position 1, the device 1 is in a neutral stage, wherein actuator 30 is in an unrotated position, and wherein stroke actuator plate 80 may touch the patient's chest but does not exert any force on the chest. As shown in the corresponding Position 1 of FIG. 3*b*, the patient's chest is uncompressed.

Position 2 of FIG. 3*a* illustrates a position of the automated chest compression device 1 in the early stage of compression of the chest after actuator 30 has been rotated clockwise almost 45 degrees from its original Position 1 and has made contact with the stroke actuator plate 80 through the controlled friction power converter 42. As shown in the corresponding Position 2 of FIG. 3*b*, the patient's chest is slightly compressed as a result of the downward pressure of actuator 30 on stroke actuator plate 80 through controlled friction power converter 42. In a case where this is not the first rotation, and the patient's chest may not have fully recoiled from the previous compression, it is possible that the variable power stroke actuator 30 traveled detached from the controlled friction power converter 42 until this point. At this point, the variable power stroke actuator 30 meets the stroke actuator plate 80 at its new location on the patient's chest, and starts the next compression in a push (rather than a punch) fashion.

Position 3 of FIG. 3*a* shows the position of the automated chest compression device 1 after further clockwise rotation of variable power stroke actuator 30. In this view, the actuator 30 provides force against stroke actuator plate 80 (through controlled friction power converter 42). As can be seen, stroke actuator plate 80 has moved downward linearly and provides consistent pressure against the chest, where the flexibility of the ribcage allows the chest to be compressed further toward the spine. As shown in the corresponding Position 3 of FIG. 3*b*, the patient's chest is further compressed as a result of the further downward pressure of actuator 30 on stroke actuator plate 80 through controlled friction power converter 42 by virtue of further clockwise rotation of actuator 30.

Position 4 of FIG. 3*a* illustrates the position of the automated chest compression device 1 after a half clockwise rotation of variable power stroke actuator 30. In this view, in which actuator 30 has been rotated 180 degrees from its configuration in Position 1, the actuator 30 provides maximum force against stroke actuator plate 80 (through controlled friction power converter 42), such that stroke actuator plate 80 has moved further linearly and is at its maximum displacement relative to its configuration in Position 1, as shown in FIG. 2*b*. As shown in the corresponding Position 4 of FIG. 3*b*, stroke actuator plate 80 has caused the maximum displacement of the patient's ribcage toward the spine.

Positions 5 and 6 of FIG. 3*a* illustrate the position of the automated chest compression device 1 as the continuation of the rotation shaft 220 progresses the variable power stroke actuator 30 toward the starting point, shown in Position 1, in which stroke actuator plate 80 provides no pressure against the patient's chest. In the embodiment illustrated in Positions 5 and 6, actuator 30 has been rotated clockwise more than 180 degrees. Due to the particular shape of variable power stroke actuator 30, actuator 30 does not contact stroke actuator plate 80 or controlled friction power converter 42 during the rotation of actuator 30 from 180 degrees to 360 degrees. As shown in the corresponding Positions 5 and 6 of FIG. 3*b*, after stroke actuator plate 80 has reached the maximum chest compression depth shown in Position 4, stroke actuator plate 80 is released from exerting pressure upon the patient's chest, and there is no contact between the stroke actuator plate 80 and the actuator 30. The plate 80 is resting on the patient's chest, which is allowed to decompress naturally. Thus, during this transition of the position of the automated chest compression device 1 from the maximum compression shown in Position 4, through the partial decompressing states of Positions 5 and 6, to the fully decompressed state of Position 1, stroke actuator plate 80 may have contact with the patient's chest but exerts no pressure thereon, allowing the patient's chest to decompress naturally and the ribcage to expand naturally.

As discussed above, most prior art automated chest compression devices that use a plunger/piston to press the chest, retreat the plunger/piston after reaching the maximum depth. By doing that, the plunger/piston loses contact with the chest. Some of these devices include a suction means that allows them to maintain contact with the chest and even help the chest to recoil. Other devices, mainly those powered by a pneumatic method, simply discontinue the pressure on the plunger/piston after reaching the maximum depth. However, if the ribcage does not fully recoil during the pressure release, and the plunger/piston loses contact with the chest, the plunger/piston will be forced against the chest, resulting in a forceful hit against the sternum.

In contrast to a plunger that is used by most of the prior art devices, stroke actuator plate 80 may maintain contact with the patient's chest during the decompression and may follow the chest with its natural expansion (upward movement without pressure). Then, when variable power stroke actuator 30 begins its next rotation towards the chest, the automated chest compression device 1 enables smooth engagement with the chest when actuator 30 meets the stroke actuator plate 80 and continues the firm, steady and predefined distance (depth) of pressure. This solution minimizes potential collateral damage to the patient, as described in FIGS. 3*a* and 3*b*, Positions 2, 3 and 4.

This is one embodiment of the invention, where other actualizations of the push distances are within the required depth of the compression by the AHA and depending on the patient's age and size. Some embodiments of the apparatus provide the option of setting up compression distances with a selection of actuators, while other embodiments have only one option. Each of the available actuators 30 is pre-fixed. The stroke actuator plate 80 profile, which is a combination of shape, edge line, width, material strength and flexibility, and the position of the axis of rotation (rotation shaft 220) relative to stroke actuator plate 80, dictates the outcome impact on the stroke actuator plate 80 and, therefore, the ultimate impact on the targeted item/chest.

It should be noted that the specific power delivery profile of an actuator is, at least in part, defined by the segment(s) of the actuator's rotation during which pressure is applied and by the segment(s) of the actuator's rotation during which no pressure is applied, i.e., there is no contact between the actuator 30 and the stroke actuator plate 80. The variable power stroke actuator 30 for the embodiment shown in FIGS. 1, 2 and 3 has a specific power delivery profile, in which pressure is applied for part of the stroke profile, and no pressure is applied for another part of the stroke profile. The size and shape of the variable power stroke actuator 30 dictates the maximum depth and the continued pressure of the chest compression based on AHA recommendations and guidelines. In some embodiments, the distance between each point on the actuator's edge and the axis of rotation comprises the variable (or constant) pressure on the stroke actuator plate 80. Specifically, as shown in FIGS. 3*a* and 3*b*, compressive pressure is applied for approximately the first 180 degrees of rotation of actuator 30, and no compressive pressure is applied for approximately the second 180 degrees of rotation. Due to this release of pressure, this profile of actuator 30 allows for natural (pressure free) expansion of the heart and lungs before the next power stroke is applied, as per AHA guidelines.

In this embodiment of the invention, the variable power stroke actuator 30 shown in FIGS. 1, 2 and 3 is preset within and predefined as part of the automated chest compression device 1 and dictates the maximum compression depth and the smoothness of the motion in the touchpoint to the chest for CPR operation. However, should the AHA recommend, for example, that it is better to serve CPR patients by administering a different timing, depth and amount of pressure, the variable power stroke actuator 30 within automated chest compression device 1 can be accordingly changed to a differently-shaped actuator in order to support such requirement without any other changes to the other parts of the automated chest compression device 1. By replacing one variable power stroke actuator 30 with another that is different in size, shape or edge/surface contour, the compression profile can be changed accordingly.

Accordingly, by changing the actuator to one with a different profile, the same device can deliver different outcomes. Thus, the heretofore described embodiment has one actuator 30 mounted within the device, the actuator 30 having a pre-defined shape that is useful for delivering a specific CPR compression pattern, e.g., to adults, and this actuator 30 would have to be removed and replaced with a different actuator in order to deliver a different CPR compression pattern.

Figure 4:
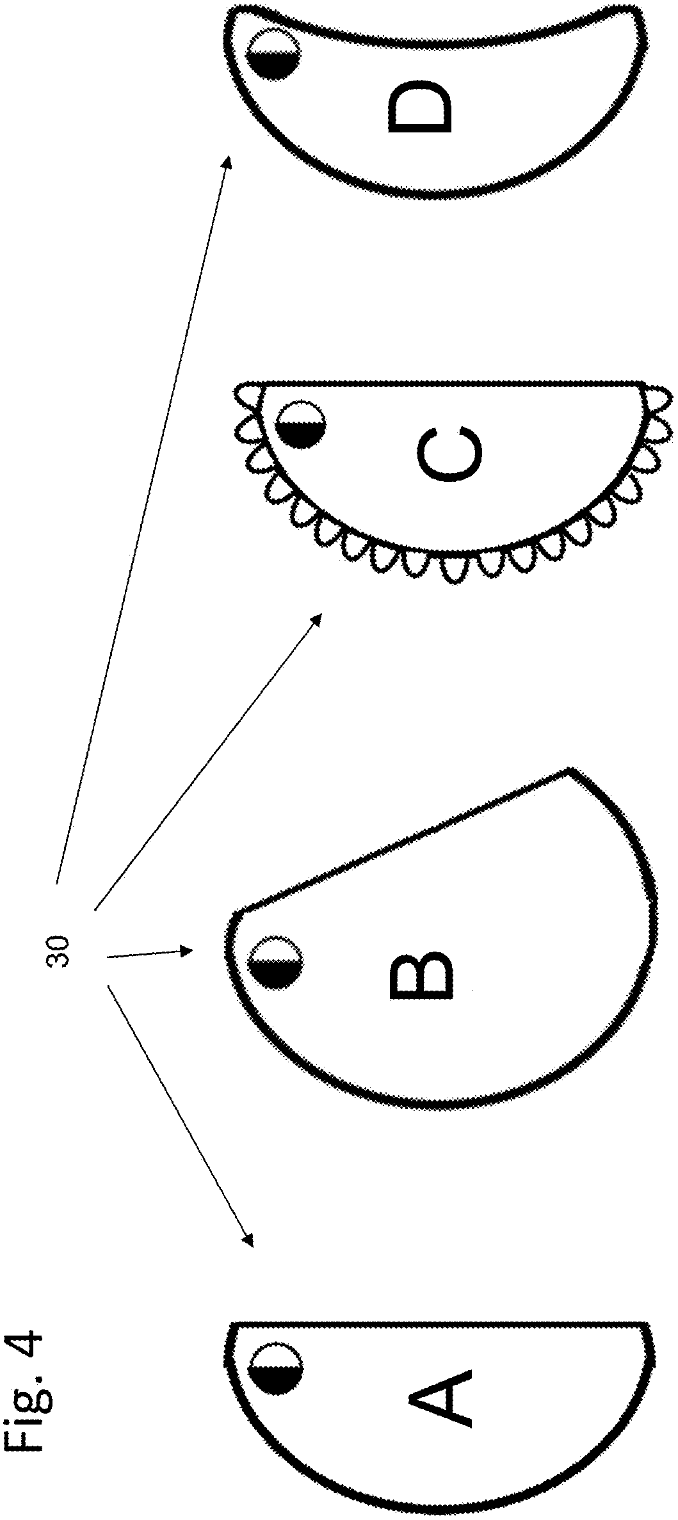
FIG. 4 illustrates four variable stroke actuators with different profiles.

It is possible to adjust the compression depth and the constant pressure, for example, by creating special models of variable power stroke actuator 30 that are appropriate for children or other communities with defined average body size. By changing or customizing the variable power stroke actuator 30, the automated chest compression device 1 can made to have a different compression profile, i.e., a different depth and timing of compression and decompression. FIG. 4 illustrates four exemplary shapes/profiles of variable power stroke actuator 30, marked as A, B, C and D, that can be used alternatively in the automated chest compression device 1 described herein, although many other different shapes/profiles of variable power stroke actuator 30 are possible.

The first profile shown in FIG. 4, indicated as A, is the customization for CPR based on AHA guidelines as shown in FIGS. 1, 2 and 3, namely approximately a 180°/180° pressure/release ratio, meaning that the compression and decompression last approximately the exact same segment of the rotation of the actuator A, which means that the compression and decompression last approximately an equal amount of time. The second profile shown in FIG. 4, indicated as B, enhances the profile pressure/release ratio to approximately a 225°/135° ratio, meaning that the compression pressure lasts for approximately a 225° segment of the rotation of actuator B and the decompression release lasts for approximately a 135° segment of the rotation of actuator B, thereby extending the pressure on the stroke actuator plate 80 for longer than when using element A. The third profile shown in FIG. 4, indicated as C, includes outline touchpoints with the stroke actuator plate 80 (using, in some embodiments, the controlled friction power converter 42), which is shaped as a rough edge, which will cause the stroke actuator plate 80 to vibrate through the pressure delivery cycle. Separate from the vibration, however, actuator C yields the same approximately 180°/180° pressure/release ratio as does actuator A. The fourth profile shown in FIG. 4, indicated as D, has essentially the same function as that of Profile A, with a 180°/180° pressure/release ratio, and still guarantees that there is no touchpoint of the profile D actuator 30 with the pressure plate 80 while the chest retreats. Profile D differs from Profile A in that the "decompression side" can be convex to demonstrate that the "decompression side" of a profile need not have a straight edge, as shown in profiles A-C, for the actuator to exert no pressure on, and to have no contact with, the pressure plate 80 during the decompression segment of the actuator's rotation. Naturally, it should be clear that other variations of actuator 30 can be used, customized to the CPR compression effect desired.

Figure 4A:
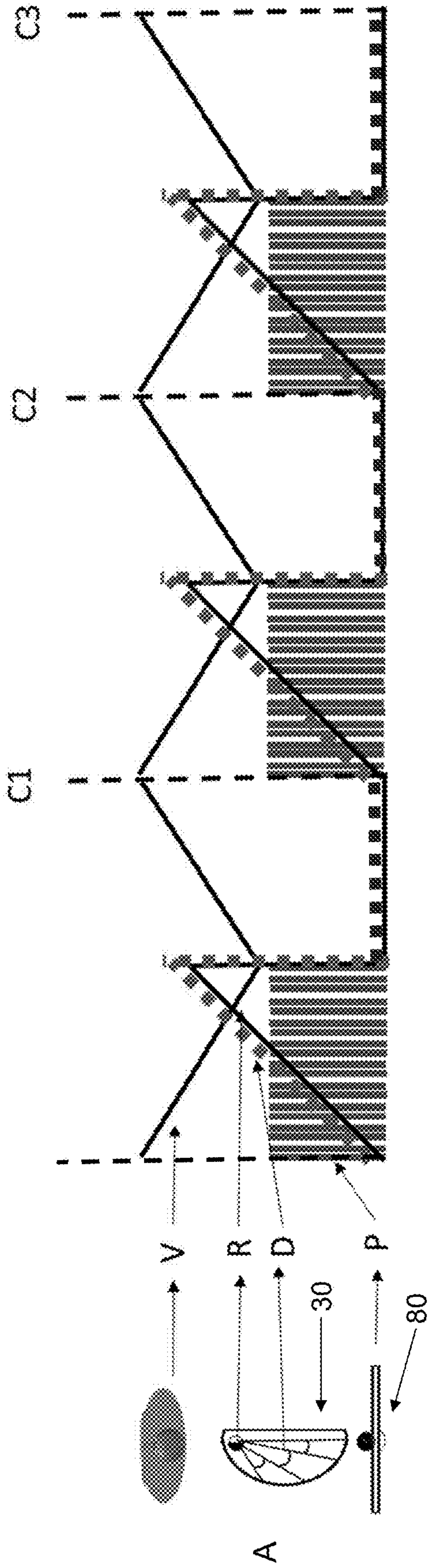
FIG. 4*a* graphically illustrates the outcome on CPR of the variable actuator A shown in FIG. 4.
Figure 4B:
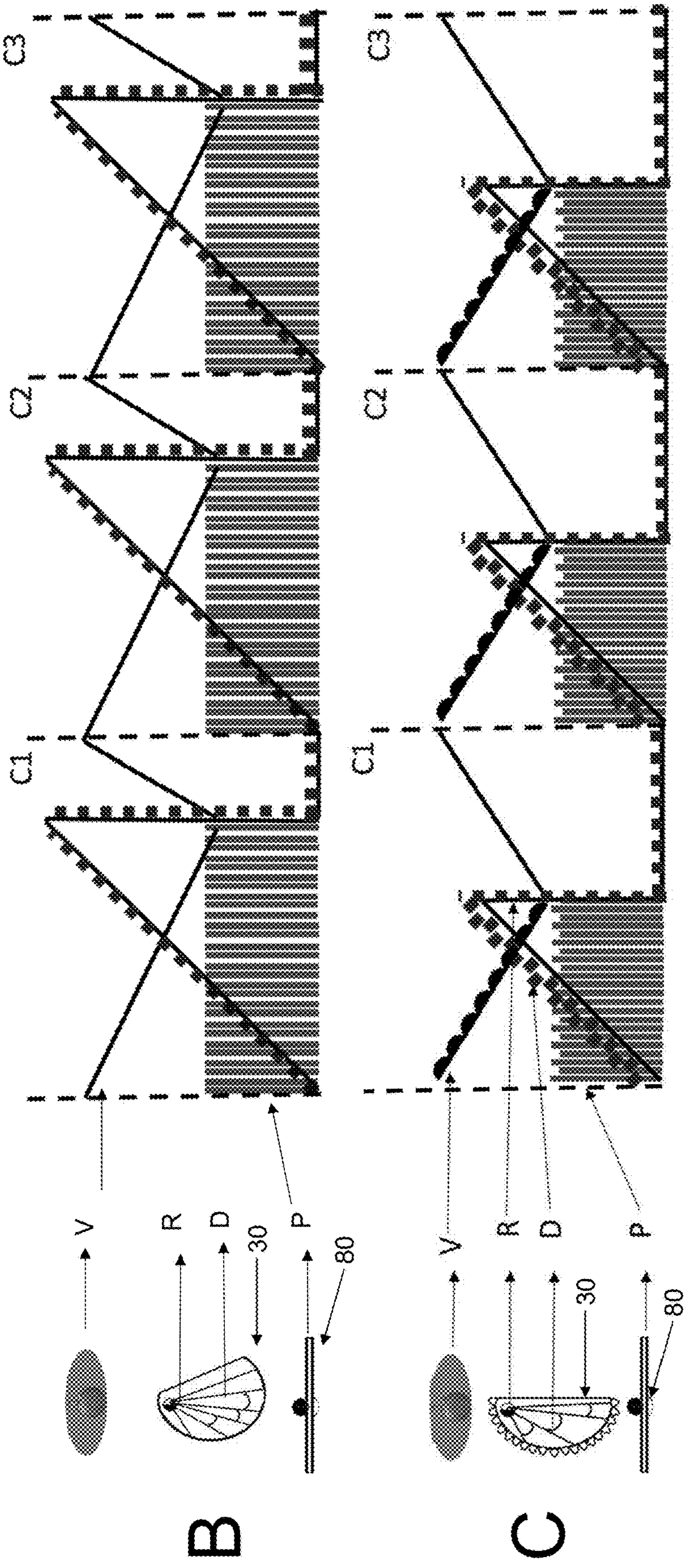
FIG. 4*b* graphically illustrates the outcome on CPR of the variable actuators B and C shown in FIG. 4.

FIGS. 4*a* and 4*b* are a set of graphs that graphically illustrate the outcome on three cycles of CPR compression using the variable actuators A, B and C shown in FIG. 4. With each compression, the graph depicts the decrease in the patient's chest cavity volume against the progress of the variable power stroke actuator 30 along its line of contact with the stroke actuator (compression) plate 80.

Each of the graphs in FIGS. 4*a* and 4*b* illustrates the compression for three cycles, and each is a rotation of 360° of the actuators A, B and C shown in FIG. 4 about shaft 220. In FIGS. 4*a* and 4*b*, the X-axis represents rotation degrees, which represents the completion of each cycle to 360°, and the Y axis represents multiple measures to support each of the lines. Specifically:

- the P line represents pressure measured by pounds per square inch (PSI);
- the R line (rotation ratio) represents the progress of the variable power stroke actuator 30 touch-point with the stroke actuator plate 80 (in some embodiments through controlled friction power converter 42), as the ratio of the rotation radius to the actuator 30 profile;
- the D line (accumulative distance) represents the impact of the shape of the edge of the variable power stroke actuator 30 on the outcome of the stroke actuator plate 80 (in some embodiments through controlled friction power converter 42) movement; and
- the V line (volume) represents the changes in the chest cavity volume in cubic centimeters.

FIG. 4*a* graphically illustrates the relationship between the rotation (line R) of actuator A, the distance (line D) traveled along the edge of actuator A (the points of contacts degrees of the actuator profile), the compression pressure (line P) exerted by stroke actuator plate 80, and the effect on the patient's chest cavity volume (line V). With each compression, the graph depicts an exertion of constant pressure P, which results in a decrease in chest volume V as the point of contact D of the actuator with the compression plate progresses along its profile. As the actuator rotates (line R), the contact D between the actuator 30 and stroke actuator plate 80 progresses around the actuator profile, producing a steady pressure P on the chest, resulting in the chest volume V being reduced. As the actuator 30 contact D reaches its endpoint, with the maximum depth allowed by the shape profile of the actuator 30, the actuator 30 continues its rotation R without any pressure of the stroke actuator plate 80 against the patient's chest. At this point, the variable power stroke actuator 30 continues to rotate R with no touchpoint D and, therefore, no pressure P, and the patient's chest recoils and its cavity volume V increases. The actuator 30 continues rotating (line D) as the chest cavity volume (line V) increases, until the end of cycle 1 (C1), whereupon actuator 30 meets to meet stroke actuator plate 80 again, and cycle 2 (C2) starts.

Graphs B and C in FIG. 4*b* have similar cycles as graph A in FIG. 4*a*, demonstrating different behavior while keeping the synergy between the actuator motion, the compression pressure, and the effect on the patient's chest volume. Graph B of FIG. 4*b* shows the extension of the chest pressure time (vs. Graphs A and C) that is achieved by extending the size of the variable power stroke actuator 30 pressure delivery, by changing the contact/compression segment of the profile from 180° to 225°. Graph C of FIG. 4*b*, with the same cycle as Graph A, shows the result of vibration achieved while providing CPR by changing the edge contour of the actuator 30.

Figure 4C:
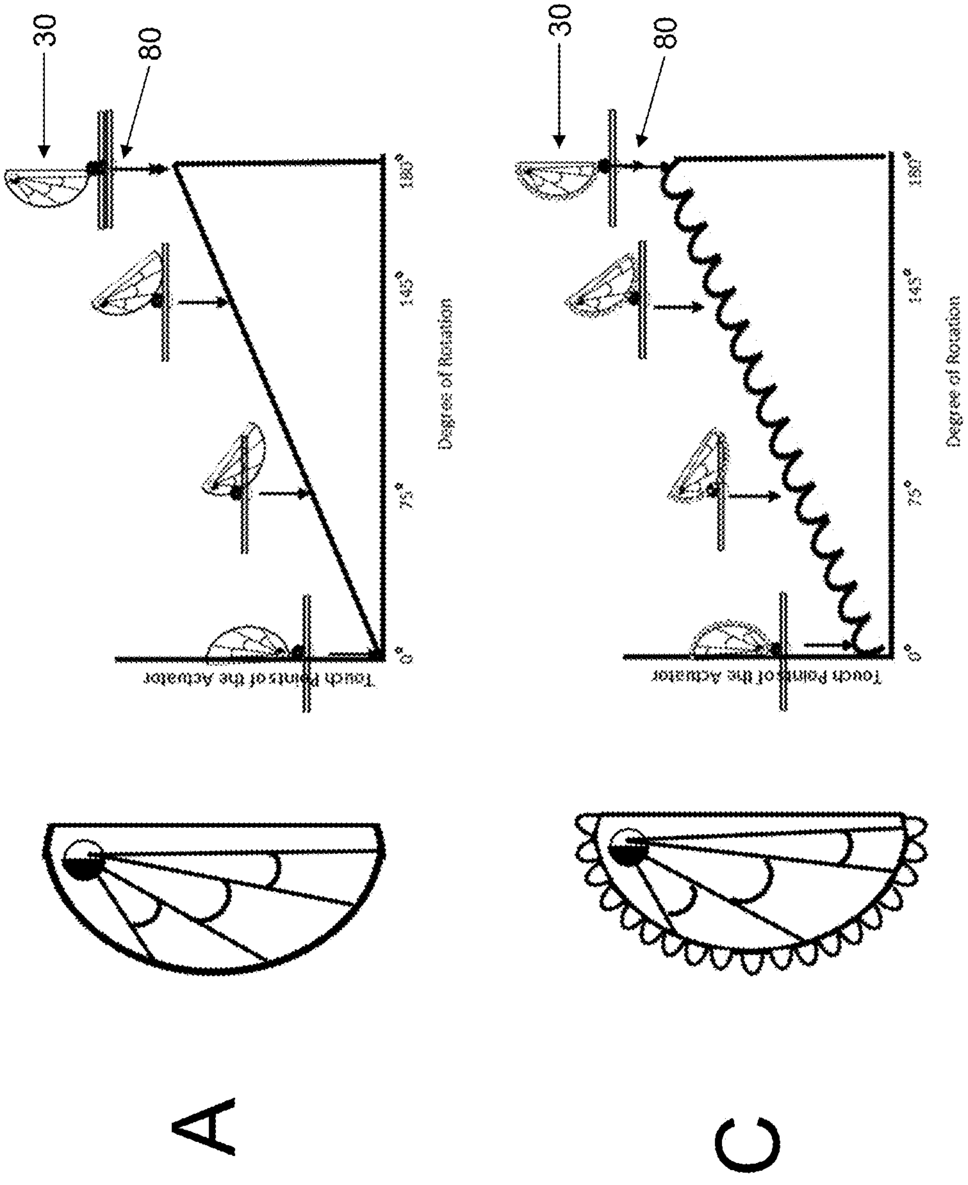
FIG. 4*c* graphically illustrates the 180 degrees of rotation plotted against the touch points of the variable actuators A and C shown in FIG. 4.

The graphs in FIG. 4*c* focus on the variable power actuator 30 demonstrating two of many possible shapes, namely actuators A and C in FIG. 4. The marked touch points on the edges of the variable power stroke actuator 30 along with matching illustration of the variable power stroke actuator 30 position during the rotation demonstrate the outcome behavior of the compression for the specific profile, establishing another meaning of the "variable" part of the element's name.

The stroke actuator plate 80 provides the additional function of cushioning the power stroke, using an automated way to compensate for adjustments needed to the depth of the stroke for a variable depth based on the strength required to compress the rib cage. For example, in case the patient had suffered a car accident where he/she suffered some damage to the rib cage, which prevents the automated chest compression device from delivering the full depth of stroke, the stroke actuator plate 80 can absorb and eliminate depth movement based on the material used. The uniqueness of the variable power stroke actuator 30 profile is that it allows us to influence different elements that impact movement: Speed (Rotation Rate), Depth (Absolute, Variable, Ratio) and Pressure (Value, Ratio). While using a controlled-speed motor as a source for a controlled turning rate of 360-degree circular motion.

Figure 5:
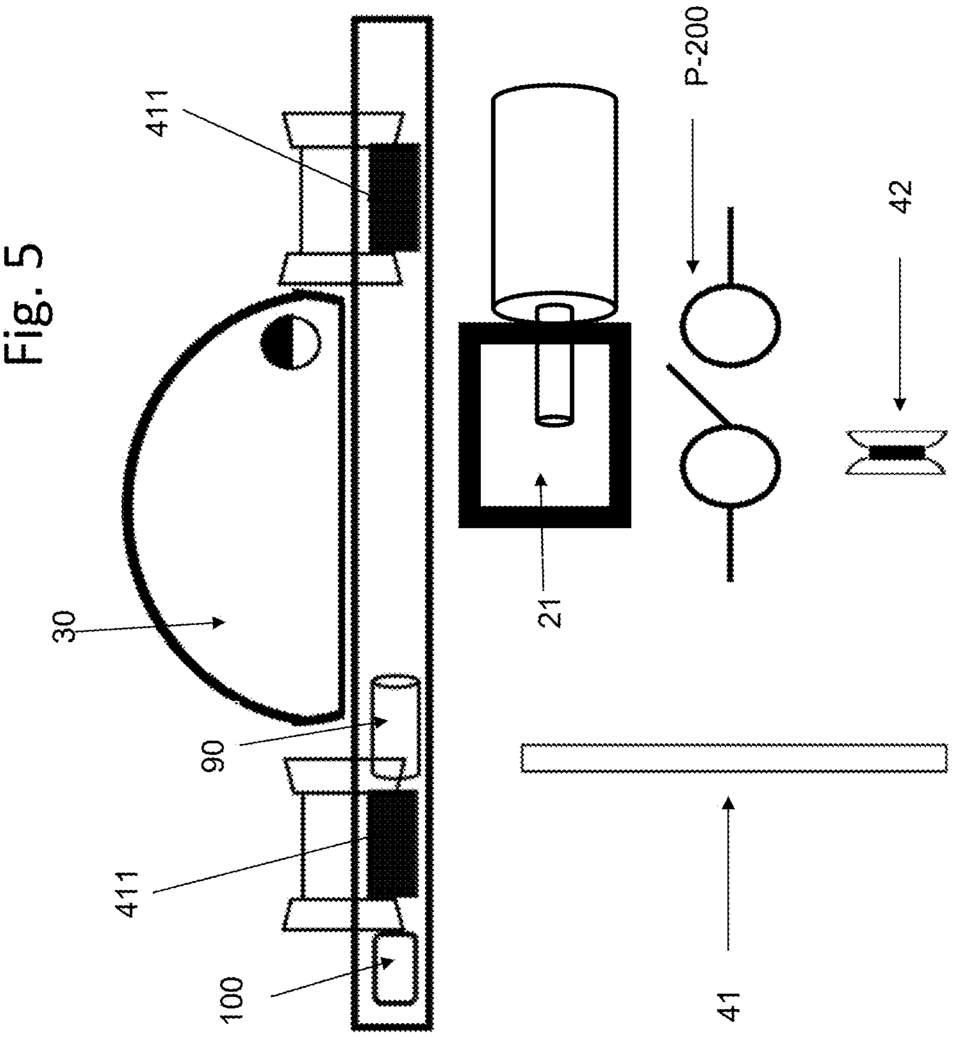
FIG. 5 is a schematic illustration of the apparatus of the present invention focusing on the apparatus's safety components.

The automated chest compression device may also include built-in sensing, safety and/or emergency components, and FIG. 5 focuses on the safety components thereof. Each embodiment may host a different set of safety elements. The decision to administer CPR is solely by the bystander, and the bystander can perform manual CPR or use the automated chest compression device as his/her proxy. If the device does not function properly, i.e., according to its setup standards, the safety component will alert the user, and the user can power off the device or decide to continue despite the alert. Some embodiments may include device-independent stoppage of the CPR and release of the pressure from the patient chest.

FIG. 5 illustrates an embodiment that includes a set of safety measures, while other embodiments may include a subset of these elements or additional safety elements: (a) one or more linear rails, in different embodiments, to stabilize the operation of the automated chest compression device, (b) retreating the stroke actuator plate 80 to the highest/initial stage, releasing the pressure from the chest, and (c) real-time sensor that provides input to the real-time response unit to identify and respond if a breaching of the AHA minimum requirements for CPR is identified.

One of the automated chest compression device's built-in sensing/safety/emergency components is the linear rails 41 used to guide the compression motion. Because the automated chest compression device should be able to perform chest compression regardless of the patient's body position, the motion of the stroke actuator plate 80 can move up and down when the patient is prone or can move parallel to the ground when the patient's body is sitting or lying sideways. The linear guides 41 ensure that the motion of the stroke actuator plate 80 will always be linear from the bracket 60 toward the patient's spine.

While FIG. 5 focuses on the safety components of the automated chest compression device, the power unit is external and not an invented component. Nevertheless, the reduction gear box 21, shown in FIG. 1*a*, is regarded as a safety component because it regulates the power of the motor into a specific number of Rotation Per Minute (RPM) that meets the AHA guidelines. It is possible to regulate the RPM by adding an RPM regulator by using a voltage controller to the device.

The safety functions of the linear rail 41, linear guide 412, linear guide opening 411, and controlled-friction power converter 42 have been described hereinabove. The main safety feature they provide is stability and smoothness of the motion of the chest compression. Each embodiment may host a different set of safety elements and a different number of elements of the same kind. For example, a single linear rail 41, along with its associated linear guide opening 411 and linear guide 412 in one embodiment, and multiple linear rails with multiple associated elements in other embodiments. In general, devices that are critical to the welfare of patients may need redundancy of safety measures to avoid a single point of failure (SPF). The art needs to be able to be configured for many options of embodiments based on requirements.

A safety element that has no illustration is the response to the electrical switch P 200 that is part of the power unit 10. When it is turned off, the switch delays the shutdown, thereby allowing the retraction of the stroke actuator plate 80, e.g., to position 1 in FIG. 3*a*, and releasing the pressure of the chest. There are ways to embed or configure the electrical switch P-200 in the real-time response unit 100.

Figure 6:
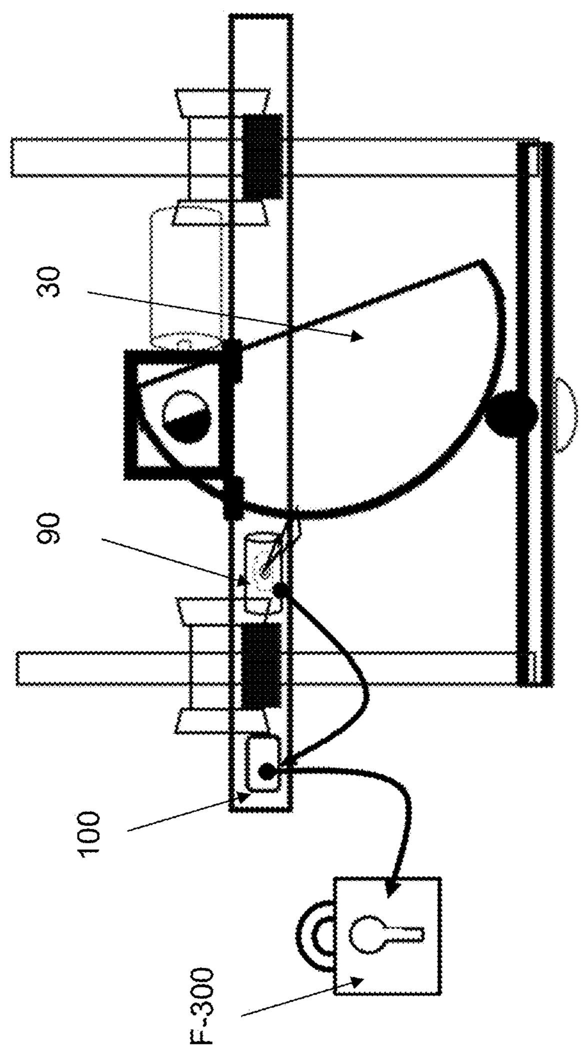
FIG. 6 is a schematic illustration of the device of the present invention including an Emergency Response System.

FIG. 6 illustrates an emergency response system that can be implemented, if the device is not operated as planned, for example, if the stroke actuator plate 80 is stuck while performing the chest compression. In such a case, the real-time sensor 90 monitors the rotation, and the real-time response unit 100 will act when the rotation stops (for any reason) for more than a pre-set time. The result of the real-time response unit 100 action may include an alert to the user, such as an alarm (audio), blinking red light (visual), switch off the electrical switch P-200 with delay, or unlocking element P-300, if it exists on the CPR's positioning device, which releases all pressure from the patient's chest. Both elements should include a backup independent power source.

Although the apparatus as described herein is adapted for use in performing automated CPR, the apparatus can also perform as a multi-function device that combines compression with the outcome of the variable power stroke actuator 30 and delivers the pressure through the stroke actuator plate 80. For example, the apparatus can be small so as to deliver soft compression with vibration (e.g., for massage) or can be large so as to provide compression and vibration (e.g., for cement hardening).

While some embodiments of the device have a single variable power stroke actuator 30 preset within it, some embodiments of the automated chest compression device 1 may have the option to either select other mounted versions of the variable power stroke actuator 30, e.g., to fit patients of different sizes or to provide various specific compressive effects. Thus, in one alternative embodiment, automated chest compression device 1 may include multiple actuators 30, such as a set of differently-shaped actuators, mounted within the device, e.g., on shaft 220, wherein each of the actuators has a different shape or profile, from which one actuator 30 can be selected by the user to provide a different CPR compression pattern and yield a different CPR outcome, such as CPR for different ages, vibration to release blood clots, flattening bumps, and more. In this embodiment, the user may enable CPR for smaller or larger chest sizes, or may achieve a specific compression effect, simply by choosing the appropriate actuator from the set of mounted actuators, e.g., by turning a knob and selecting the appropriate actuator 30 prior to use of the device to provide CPR. For example, one option is to shift the stroke actuator plate 80 so that the touchpoint of the low-friction will be against the selected actuator that fits the size of the patient's chest.

Figure 7:
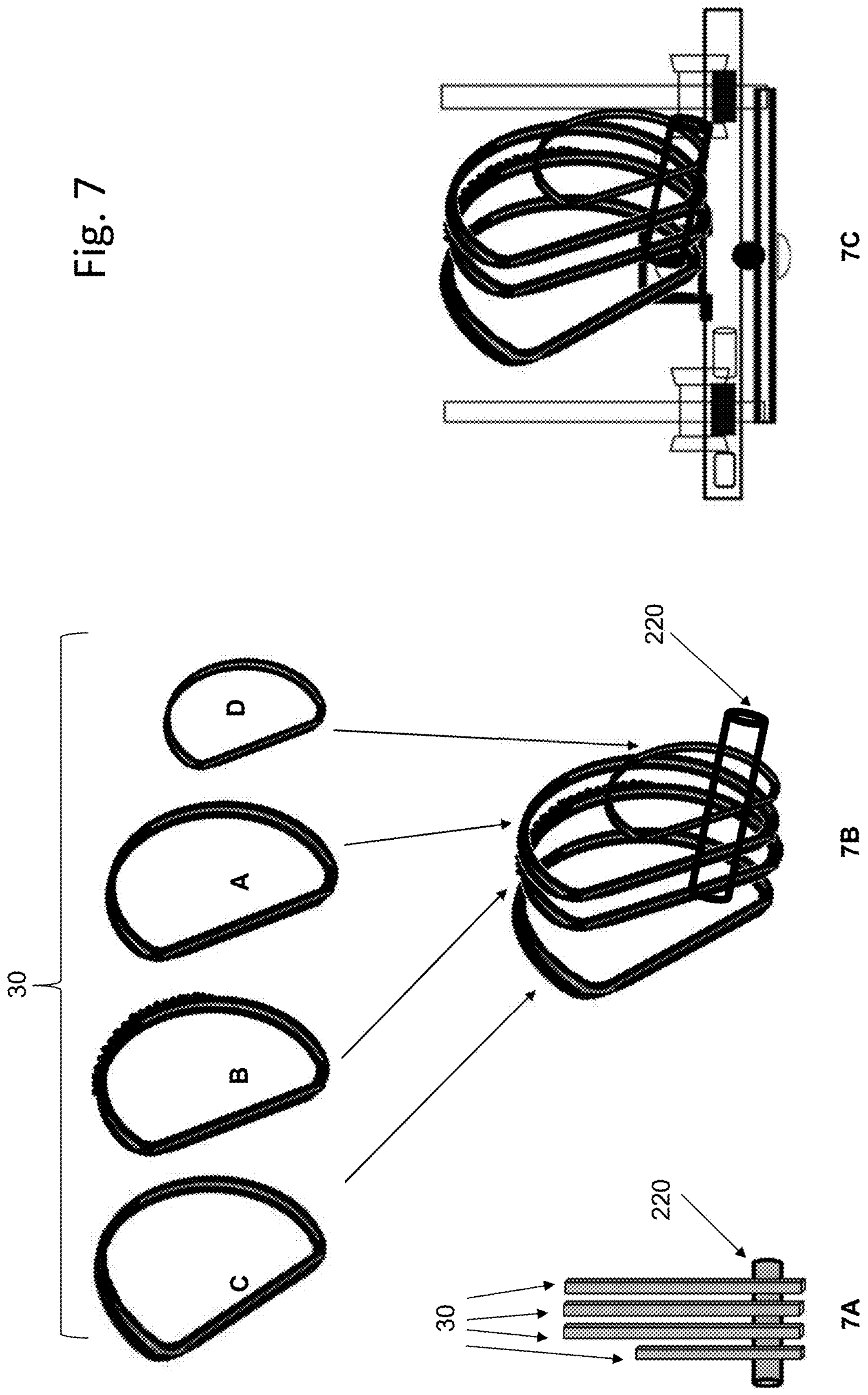
FIG. 7 is a schematic illustration of an embodiment the device of the present invention including more than one selectable actuator mounted on the same shaft.

FIG. 7 illustrates one embodiment that includes several actuators A-D, each in its own profile and size, which enable the user to adapt the automated chest compression device to administer the required compression characteristics based on the patient's needs, size, and shape. For example, the automated chest compression device 1 can operate on a chest smaller than an adult's, but a different actuator would need to be used due to the CPR compression effect that would need to be administered.

For example, when administering CPR to an adult, the AHA guidelines for CPR specify a compression depth of 2.2 inches, and actuator A should be used. In cases where there is a need to extend the compression time and decrease the release time, for example when administering CPR to a child, for whom the AHA guidelines for CPR specify a compression depth of 1.5 inches, an actuator C, with an approximate 220-degree compression side, will meet the requirement. If CPR is needed on an infant, actuator D, which has a smaller circumference and a 180-degree profile with a smooth edge for shallower compression than the other profiles, should be used.

Other available options in the embodiment illustrated in FIG. 7 enable compression with vibration. For example, should the AHA recommend vibration while performing chest compression, selecting actuator B with a rough edge will vibrate the chest during the compression.

As shown in FIGS. 7A-7C, one embodiment shows several actuators 30 mounted on the motor shaft 220. Using, e.g., a selector switch or pressing on the shaft or some other selection device known in the art, the user can choose one of the several actuators 30 for use in a particular CPR activity. For example, the selection can move the axis in one direction or the other until the selected profile is placed in front of the pressure plate, such that, when the motor is turned on, only the selected actuator 30 will rotate. FIGS. 7A and 7B shows side and perspective views, respectively, of the shaft 220 on which four actuators with different profiles are assembled. FIG. 7C shows these four actuators with different profiles assembled within the automated chest compression device 1. Of course, fewer or more than four actuators can be provided on motor shaft 220, and each actuator can be customized for its compression/decompression effect (timing, depth and amount of pressure).

Some embodiments may also include a dial or button that allows the user to select the desired rotation rate within the motor's range. In this manner, even if the actuator 30 is not changed, the user is able to vary the compression rate at the same compression depth and timing using the same actuator.

Figure 8:
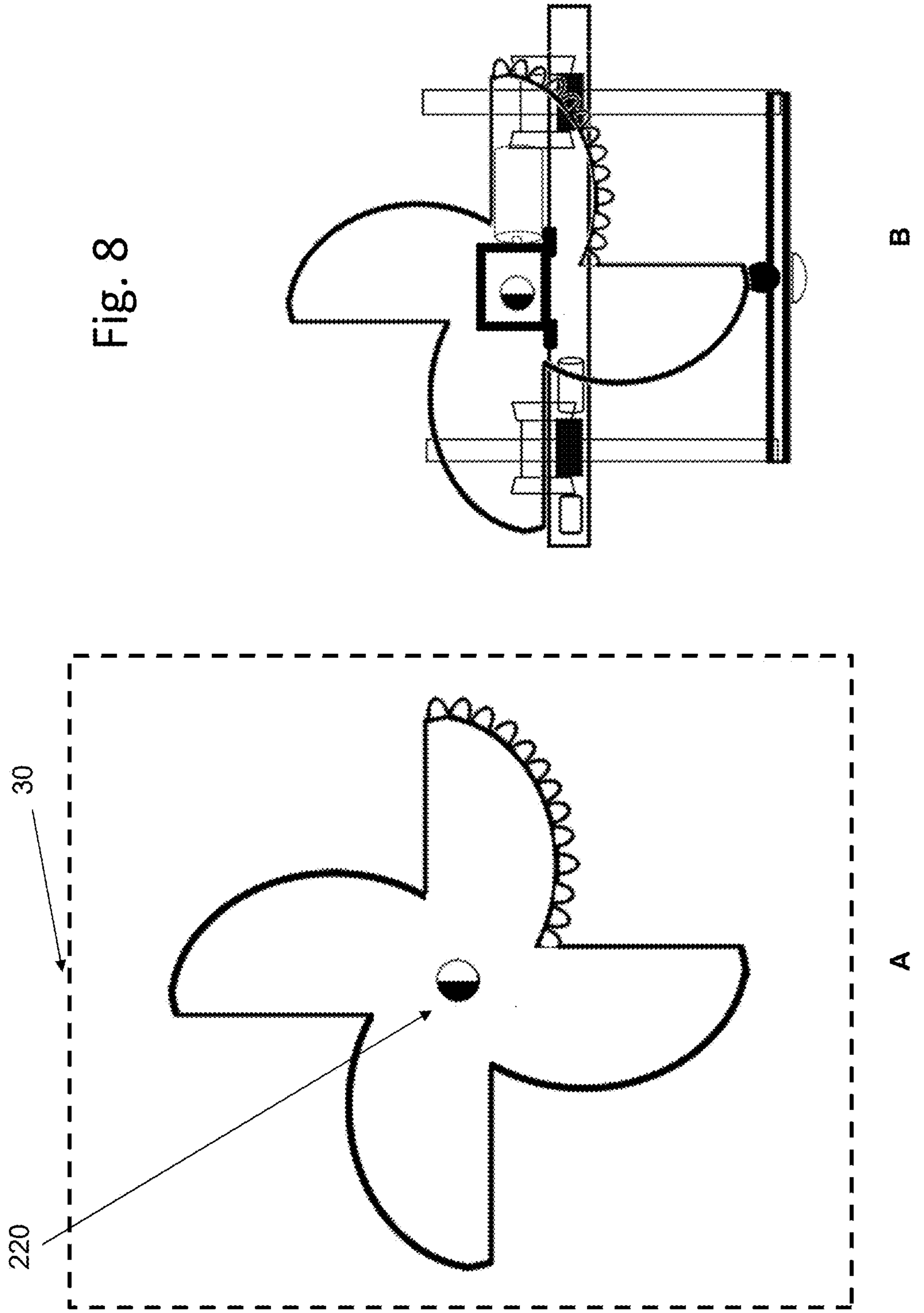
FIG. 8 is a schematic illustration of an embodiment of the invention wherein a single centrally-mounted actuator has more than one compression/decompression portion within the same actuator profile.

In yet another embodiment, the automated chest compression device 1 may include multiple actuators mounted on the same motor shaft but not for selection of one actuator from among them, as shown in FIG. 7, but rather for successive effect. As illustrated in FIG. 8, the variable power stroke actuator 30 may be a combination of multiple profile portions, or sub-actuators. Thus, rather than variable power stroke actuator 30 having a single preset profile as shown in FIGS. 1-3, the actuator 30 may have multiple profile portions, e.g., two or more, such as sub-profiles, mounted on the same rotatable shaft 220. For example, FIG. 8 shows four profile portions combined into a single variable power stroke actuator 30, where the profile of a single variable power stroke actuator 30 can be customized for multi-compressions in a single rotation of the actuator 30. Some embodiments may combine several different actuator profile portions, wherein each actuator profile portion may produce a compression that is the same or different from the other actuator profile portions, and wherein all of them may be combined into a single customized variable power stroke actuator 30 profile.

FIG. 8A shows four profile portions arranged around a single centrally mounted actuator 30, and FIG. 8B shows actuator 30 mounted on rotor axis 220. In the embodiment shown in FIG. 8, the shaft 220 is in the center of the customized actuator profile. In this embodiment, the profile of actuator 30 could satisfy additional requirements for a more sophisticated compression profile that would improve the flexibility and functionality of the device. For example, actuator 30 could have two or more portions, each of which supports a separate compression/decompression cycle, such that actuator 30 provides multiple compression cycles, each with unique depth, pressure and duration characteristics, within the same actuator profile.

FIG. 8 illustrates and emphasizes another "variable" capability of the variable power stroke actuator 30. As stated before, the actuator profile customization dictates the outcome of the compression while the motor rotates the axis. Whereas FIG. 4 demonstrates the actuator's profile based on a single compression per rotation, wherein the shaft is eccentric mounted to the actuator 30, FIG. 8 illustrates an embodiment wherein the actuator profile enables more than one compression per rotation. FIG. 8 emphasizes the function of the actuator and its central role of being fit-to-purpose, where the purpose is the compression outcome. In this embodiment, the actuator is shaped for four different compression profile portions, wherein three of the profile portions of actuator 30 produce smooth compression, and one profile portion of actuator 30 produces vibrated compression, i.e., will vibrate the chest while the compression is being performed. Each compression will meet the required depth and force needed for the compression. Of course, fewer or more than four profile portions can be provided, and each profile portion can be customized for its compression/decompression effect (timing, depth and amount of pressure).

In addition, where there are multiple actuator portions, the rotation of actuator 30 is around the center of the actuator's axis, such that the speed can be reduced in accordance with the number of actuator portions that are arranged around actuator 30, while the number of overall compressions per minute can remain constant. For example, in the embodiment of FIG. 8, wherein four actuator portions are arranged around actuator 30, the motor speed can be reduced to a fourth of what it would be for a single actuator profile as shown in FIG. 1. Keeping the number of chest compressions at of 100 to 120 compressions per minute (CPM), as guided by the current AHA guidelines for CPR, the rotation will be between 25 to 30 rotations per minute (RPM), providing 100 to 120 CPM. Positioning the axis in the center of the actuator will minimize vibration and produce equal motor torque for each compression.

Thus, an automated chest compression device is disclosed. In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

REFERENCE CHARACTERS

1 automated chest compression device
10 power unit

21 reduction gear box
30 variable power stroke actuator
41 linear rail
42 controlled friction power converter
50 chest pressure plate
60 bracket
70 motor to frame mounts
80 stroke actuator plate
90 real-time sensor
100 real-time response unit
220 rotation shaft
411 linear guide opening
412 linear guide
P-200 (External) electrical switch
P-300 (External) unlocking element

The invention claimed is:

1. An automated chest compression device for providing cardiopulmonary resuscitation (CPR) to a patient, comprising:

an actuator plate rotatably mounted about a rotation shaft, wherein the rotation shaft is mounted off a center of area of the actuator plate;

a power delivery unit operable to rotate the actuator plate about the rotation shaft;

a chest compression plate configured to move linearly in a direction orthogonal to the rotation shaft as a result of rotation of the actuator plate and based on a shape of the actuator plate;

wherein engagement of the actuator plate with the chest compression plate converts rotary motion of the actuator plate into linear motion of the chest compression plate;

at least one linear rail mounted directly to the chest compression plate at a location spaced away from the actuator plate rotation shaft, said at least one linear rail being configured by its direct mounting to the chest compression plate to stabilize the linear motion of the chest compression plate as it moves linearly, without the linear rail deriving any power from the rotation of the actuator;

wherein a first portion of the shape of the actuator plate occupies a first segment of the rotation of the actuator plate, and a second portion of the shape of the actuator plate occupies a second segment of the rotation of the actuator plate;

whereby, when the device is positioned against a chest of the patient in need of cardiopulmonary resuscitation (CPR), rotation of the actuator plate causes the actuator plate to engage with and exert pressure against the chest compression plate during the first segment of rotation of the actuator plate, causing the chest compression plate to move linearly towards the patient's chest and to thereby induce compression of the patient's chest, and causes the actuator plate to disengage from and exert no pressure against the chest compression plate during the second segment of rotation of the actuator plate to thereby allow decompression of the patient's chest.

2. The automated chest compression device of claim 1, wherein the shape of the actuator plate determines a timing, a force and a depth of the linear movement of the chest compression plate and thereby also a timing and a depth of the chest compression.

3. The automated chest compression device of claim 1, wherein the first portion of the shape of the actuator is curved outward.

4. The automated chest compression device of claim 3, wherein the second portion of the shape of the actuator is not curved outward.

5. The automated chest compression device of claim 4, wherein the first and second segments of the actuator's rotation together total 360 degrees.

6. The automated chest compression device of claim 4, wherein the second portion of the shape of the actuator is flat or concave.

7. The automated chest compression device of claim 4, wherein the device comprises no mechanism to move the chest compression plate away from the patient's chest during the second segment of rotation of the actuator.

8. The automated chest compression device of claim 1, wherein the first and second segments of the actuator's rotation are both approximately 180 degrees.

9. The automated chest compression device of claim 1, wherein either:

the first segment of the actuator plate's rotation is greater than 180 degrees, and the second segment of the actuator plate's rotation is less than 180 degrees, or the first segment of the actuator plate's rotation is less than 180 degrees, and the second segment of the actuator plate's rotation is greater than 180 degrees, or both the first and second segments of the actuator plate's rotation are less than 180 degrees, and one or more additional segments of the actuator plate's rotation complete the 360 degrees of rotation.

10. The automated chest compression device of claim 1, further comprising a rotating or sliding body situated between the actuator plate and the chest compression plate, wherein the rotating or sliding body controls lateral and/or frictional forces between the actuator plate and the chest compression plate.

11. The automated chest compression device of claim 10, wherein the rotating body is arranged substantially directly under the rotation shaft of the actuator plate.

12. The automated chest compression device of claim 1, wherein the at least one linear rail comprises two linear rails that stabilize the chest compression plate and keep it level as it moves linearly.

13. The automated chest compression device of claim 1, wherein at least two actuator plates, each having a different shape or size that determines a timing, a force and a depth of the linear movement of the chest compression plate and thereby also a timing a force and a depth of the chest compression, are mounted to the shaft concurrently, and wherein each actuator plate can be alternatively selected by a user for use at a particular time.

14. The automated chest compression device of claim 1, wherein the chest compression plate has a protruding portion surrounded by a flat perimeter.

15. The automated chest compression device of claim 14, wherein the flat perimeter of the chest compression plate is sufficiently wide to enable its placement across the chest of the patient during cardiopulmonary resuscitation (CPR) compression to capture tips of the ribs of the patient.

16. The automated chest compression device of claim 15, wherein the protruding portion is configured to move towards the sternum of the patient as the flat perimeter is compressed against the ribs of the patient during a cardiopulmonary resuscitation (CPR) compression/decompression cycle.

17. The automated chest compression device of claim 1, wherein the device is configured to be mounted to, and to be detached from, a positioning apparatus that is attachable to the patient to provide counterpressure at the patient's back to enable cardiopulmonary resuscitation (CPR) compression of the chest of the patient.

18. The automated chest compression device of claim 17, wherein the positioning apparatus is configured to be mounted around the patient's body, and wherein the device, when mounted to the positioning apparatus mounted around the patient's body, is configured to deliver cardiopulmonary resuscitation (CPR) compression to the patient even when the patient is in a sitting position or is lying sideways.

* * * * *